United States Patent
Khalid et al.

(10) Patent No.: US 12,407,274 B2
(45) Date of Patent: Sep. 2, 2025

(54) INVERTER TOPOLOGY CIRCUIT

(71) Applicant: KING FAHD UNIVERSITY OF PETROLEUM AND MINERALS, Dhahran (SA)

(72) Inventors: Muhammad Khalid, Dhahran (SA); Mohammad Ali, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 292 days.

(21) Appl. No.: 18/191,934

(22) Filed: Mar. 29, 2023

(65) Prior Publication Data

US 2024/0333176 A1    Oct. 3, 2024

(51) Int. Cl.
*H02M 7/5387* (2007.01)
*H02M 7/483* (2007.01)

(52) U.S. Cl.
CPC ..... *H02M 7/53871* (2013.01); *H02M 7/4833* (2021.05)

(58) Field of Classification Search
CPC ............ H02M 7/487; H02M 7/53871; H02M 7/4833; H02M 1/32; H02M 1/36
See application file for complete search history.

(56) References Cited

U.S. PATENT DOCUMENTS

| | | | | |
|---|---|---|---|---|
| 10,965,221 B1* | 3/2021 | Bassi | ........ | H02M 7/483 |
| 11,196,354 B1* | 12/2021 | Rawa | ........ | H02M 7/487 |
| 2021/0194382 A1* | 6/2021 | Bassi | ........ | H02M 1/0012 |
| 2022/0069736 A1* | 3/2022 | Bassi | ........ | H02M 7/4837 |

FOREIGN PATENT DOCUMENTS

| | | | | |
|---|---|---|---|---|
| CN | 110829867 A | * | 2/2020 | |
| CN | 115051585 A | | 9/2022 | |
| IN | 202011029808 | | 8/2020 | |
| IN | 202011029808 A | * | 8/2020 | |
| WO | WO-2020047677 A1 | * | 3/2020 | ........ H02M 1/0095 |

OTHER PUBLICATIONS

Translation CN-110829867-A (Year: 2020).*
Drawings and claims IN 202011029808 (Year: 2020).*
(Continued)

*Primary Examiner* — Thienvu V Tran
*Assistant Examiner* — Yahveh Comas Torres
(74) *Attorney, Agent, or Firm* — Oblon, McClelland, Maier & Neustadt, L.L.P.

(57) ABSTRACT

An inverter topology circuit that includes a direct current source; a first capacitor; a second capacitor, and a number of switches (a first switch, a second switch, a third switch, a fourth switch, a fifth switch, a sixth switch, a seventh switch, an eighth switch, a ninth switch, a tenth switch, and an eleventh switch). A first side of the first switch and a first side of the third switch are connected to a first side of the direct current source. A first side of the second switch and a first side of the fourth switch are connected to a second side of the direct current source. The first capacitor and the second capacitor are connected in series and are connected in parallel with the direct current source.

19 Claims, 20 Drawing Sheets

(56) References Cited

OTHER PUBLICATIONS

Thirteen-Level UXE-Type Inverter With 12-Band Hysteresis Current Control Employing PSO Based PI Controller, Deepak et al. IEEE Acess (p. 29890-29902) vol. 11, 2023 (Year: 2023).*
Islam et al. ; A Switched Capacitor-Based 13-null inverter With Reduced Switch Count.
Ali et al. ; A Modified Less-Switch-Count Switched-Capacitor Multilevel Inverter for Solar PV-Applications ; IEEE 2022 ; 6 Pages.
Sathik et al. ; Cross Connected Compact Switched-Capacitor Multilevel Inverter (C3-SCMLI) Topology with Reduced Switch Count ; IEEE Transactions on Circuits and Systems II: Express Briefs ; Apr. 29, 2020 ; 5 Pages.
Siddique et al. ; Single-Phase 9L Switched-Capacitor Boost Multilevel Inverter (9L-SC-BMLI) Topology ; IEEE Transactions on Industry ; Sep. 28, 2022 ; 8 Pages.

\* cited by examiner

INVERTER TOPOLOGY CIRCUIT

STATEMENT OF PRIOR DISCLOSURE BY AN INVENTOR

Aspects of the present disclosure are described in *A Modified Less-Switch-Count Switched-Capacitor Multilevel Inverter for Solar PV-Applications*, M. Ali and M. Khalid, 2022 5th International Conference on Power Electronics and their Applications (ICPEA), Hail, Saudi Arabia, incorporated herein by reference.

BACKGROUND

Technical Field

The present disclosure is directed to an inverter topology circuit.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

With global population growth, energy demand is increasing to meet the population's various needs. Renewable energy sources (RESs), such as solar energy, fuel cells, and wind energy, are preferable to non-renewable energy sources (fossil fuels) and have become the mainstream of development. The solar energy is converted into electrical energy using a photovoltaic (PV) system. PV systems are modular, easy to install, and excess energy generated can be sent to a utility grid. In the PV system, several power electronic inverter devices, such as Direct Current (DC)-Alternating Current (AC) converters, AC-DC converters, and dual-converters are required to enhance the energy produced for effective and efficient use of PV systems.

The performance and application of the PV system may depend on the performance of power electronic inverter devices. A conventional two-level inverter has defects of high harmonic content, low efficiency, and the like. With the rapid development of power electronic technology, multi-level inverters have been introduced. The multi-level inverters can generate different output voltage waveforms combining different input DC voltage sources. In multi-level inverters, increasing the number of output voltage levels improves the output voltage quality and decreases the total harmonic distortion (THD) of the output voltage waveform causing the output voltage to appear like a sinusoidal waveform. Conventional multi-level inverters include diode-clamped, capacitor-clamped, and H-bridge cascaded inverters. Both the diode-clamped multi-level inverter and the capacitor-clamped multi-level inverter have the problem that a capacitor voltage needs to be added with a voltage balancing circuit. The H-bridge cascaded multi-level inverter needs a plurality of independent direct-current power supplies. To increase the number of output voltage levels in multi-level inverters, a number of utilized power electronic components and DC sources have been increased which is not always cost-effective and is a disadvantage for these inverters.

To overcome the aforementioned issues with the multi-level inverters, switched capacitor multi-level inverters have been introduced. The switched capacitor multi-level inverters generate a large number of output voltage levels with a small number of DC voltage input sources. Moreover, the switched capacitor multi-level inverter topologies can increase the maximum output voltage without requiring a boosting stage. However, the switched capacitor-based inverter requires high voltage rating switches, which limits its application for medium voltage applications.

The conventional multi-level inverter employs a neutral point clamped (NPC) and a cascaded H-Bridge (CHB) topology. The NPC requires many electrical components. For instance, for an 11-level implementation, 14 IGBTs (insulated gate bipolar transistors), 12 diodes, and 10 capacitors are required. Also, 5 neutral points require perfect balancing, which leads to significant efforts. For an 11-level operation, 5 DC sources of equal magnitude and 20 IGBTs are required. These components and configurations have led to a complex inverter topology which is costly and less efficient.

Accordingly, it is one object of the present disclosure to provide an inverter topology circuit that reduces potential stress on switching elements and optimizes the circuit's design to achieve high voltage gain by employing fewer components.

SUMMARY

In an exemplary embodiment, an inverter topology circuit is disclosed. The circuit includes a direct current source; a first capacitor; a second capacitor, and a number of switches (a first switch, a second switch, a third switch, a fourth switch, a fifth switch, a sixth switch, a seventh switch, an eighth switch, a ninth switch, a tenth switch, and an eleventh switch). A first side of the first switch and a first side of the third switch are connected to a first side of the direct current source, while a first side of the second switch and a first side of the fourth switch are connected to a second side of the direct current source. A first side of the fifth switch and a first side of the seventh switch are connected to a second side of the third switch, while a first side of the sixth switch and a first side of the eighth switch are connected to a second side of the fourth switch. A first side of the ninth switch, a second side of the sixth switch, and a second side of the seventh switch are connected to a first side of the first capacitor. A first side of the tenth switch, a second side of the first capacitor are connected to a first side of the second capacitor. A first side of the eleventh switch, a second side of the fifth switch, and a second side of the eighth switch are connected to a second side of the second capacitor. The first capacitor and the second capacitor are connected in series and are connected in parallel with the direct current source.

In another exemplary embodiment, a method for controlling the charging and discharging of a first capacitor and a second capacitor in an inverter is disclosed. The method includes determining a DC link voltage Vdc of the inverter. The method includes determining a state of an inverter by a nearest-level control (NLC). The method includes determining a direction of current flow. The method includes determining a magnitude of an auxiliary DC link voltage. The method includes determining a threshold of the auxiliary DC link voltage. In response to the state level being $+V_{dc}/2$, the current flow being positive, and the magnitude of the auxiliary DC link voltage being higher than the threshold, charging the first capacitor and the second capacitor. In response to the state level being $+V_{dc}/2$, the current flow being positive, and the magnitude of the auxiliary DC link voltage being lower than the threshold, discharging the first capacitor and the second capacitor. In response to the state level being +$V_{dc}$/2, the current flow being negative, and the magnitude of the auxiliary DC link voltage being higher than the threshold, charging the first capacitor and the second capacitor. In response to the state level being +$V_{dc}$/2, the current flow being negative, and the magnitude of the auxiliary DC link voltage being lower than the threshold, discharging the first capacitor and the second capacitor. In response to the state level being −$V_{dc}$/2, the current flow being positive, and the magnitude of the auxiliary DC link voltage being higher than the threshold, charging the first capacitor and the second capacitor. In response to the state level being −$V_{dc}$/2, the current flow being positive, and the magnitude of the auxiliary DC link voltage being lower than the threshold, discharging the first capacitor and the second capacitor. In response to the state level being −$V_{dc}$/2, the current flow being negative, and the magnitude of the auxiliary DC link voltage being higher than the threshold, charging the first capacitor and the second capacitor. In response to the state level being −$V_{dc}$/2, the current flow being negative, and the magnitude of the auxiliary DC link voltage being lower than the threshold, discharging the first capacitor and the second capacitor.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
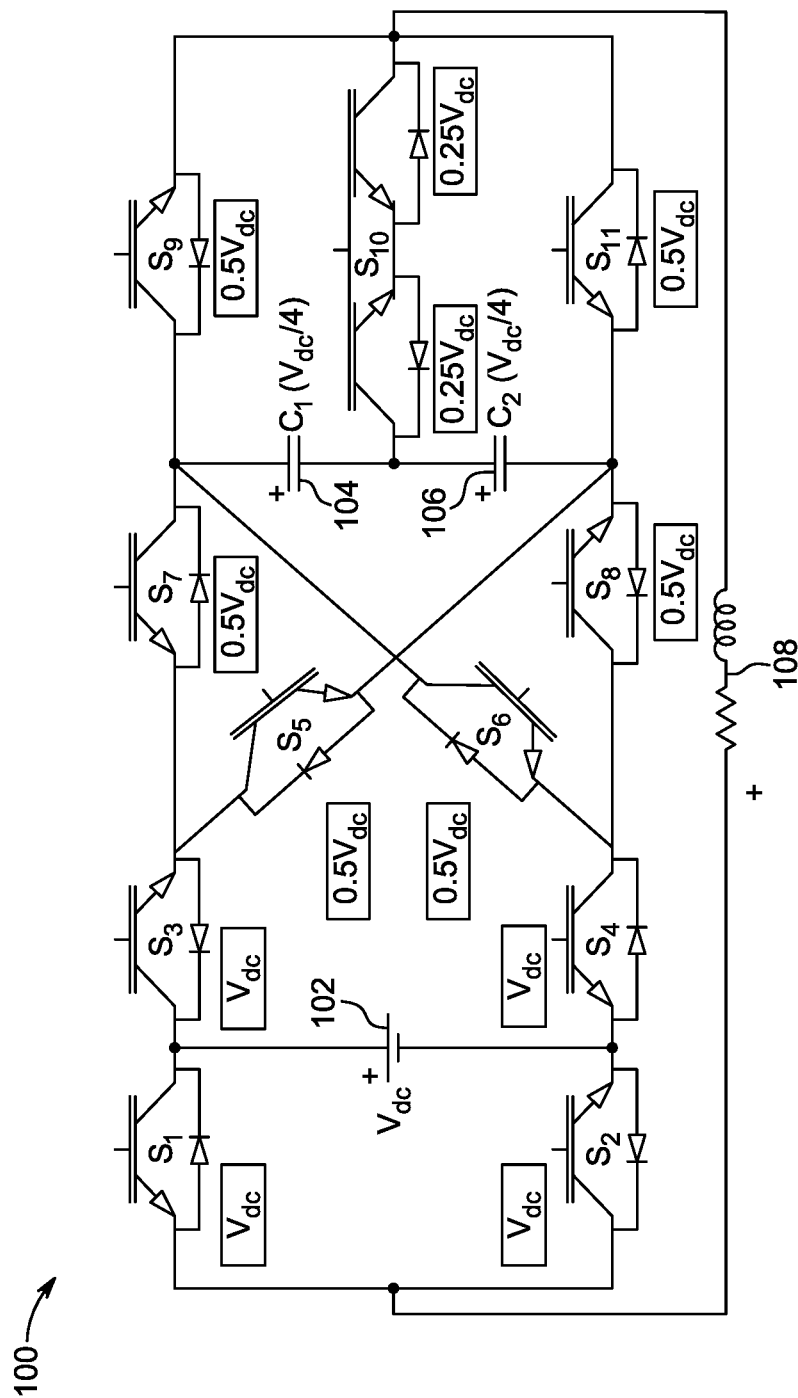
FIG. 1 illustrates a schematic diagram of an inverter topology circuit, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to an inverter for a solar PV application that employs a lower switch count. The disclosed inverter reduces the capacitors' inrush currents, resulting in increased capacitor life and reduced switch current stress. Additionally, the inverter is configured to provide an eleven (11)-level output, leading to better harmonic performance and omission or reduction of output filter size. The inverter is configured to be operated as a microinverter or string inverter in adverse temperature conditions for solar PV applications.

FIG. 1 illustrates a circuit diagram of an inverter topology circuit, according to aspects of the present disclosure (hereinafter interchangeably referred to as "circuit 100"). As shown in FIG. 1, the circuit 100 includes a direct current source 102, a first capacitor ($C_1$) 104, a second capacitor ($C_2$) 106, a plurality of switches ($S_1$-$S_{11}$), and a load 108. For example, the plurality of switches ($S_1$-$S_{11}$) includes eleven (11) switches i.e., a first switch $S_1$, a second switch $S_2$, a third switch $S_3$, a fourth switch $S_4$, a fifth switch $S_5$, a sixth switch $S_6$, a seventh switch $S_7$, an eighth switch $S_8$, a ninth switch $S_9$, a tenth switch $S_{10}$, and an eleventh switch $S_{11}$.

The direct current source 102 is configured to provide a direct current to the circuit 100. The direct current source 102 includes, but is not limited to, a plurality of photovoltaic panel arrays, a plurality of wind power turbines, a photovoltaic cell, a photovoltaic cell panel or a wind energy battery, a plurality of wave generators, and such naturally available resources. In an example, the direct current source 102 may include a plurality of direct current sources connected in parallel. In an aspect, a first side of the direct current source 102 is a positive pole, and a second side of the direct current source 102 is a negative pole.

In the circuit 100, the plurality of switches ($S_1$-$S_{11}$) may include at least any one of an insulated gate bipolar transistor (IGBT), a metal-oxide-semiconductor field-effect transistor (MOSFET), a silicon-controlled rectifier (SCR), or a gate turn-off thyristor (GTO). For example, the switches are insulated gate bipolar transistors (IGBTs).

As shown in FIG. 1, a first side of the first switch $S_1$ and a first side of the third switch $S_3$ are connected to the first side of the direct current source 102. A first side of the second switch $S_2$ and a first side of the fourth switch $S_4$ are connected to the second side of the direct current source 102. A first side of the fifth switch $S_5$ and a first side of the seventh switch $S_7$ are connected to a second side of the third switch $S_3$. A first side of the sixth switch $S_6$ and a first side of the eighth switch $S_8$ are connected to a second side of the fourth switch $S_4$.

Further, a first side of the ninth switch $S_9$, a second side of the sixth switch $S_6$, and a second side of the seventh switch $S_7$ are connected to a first side of the first capacitor 104. A first side of the tenth switch $S_{10}$ and a second side of the first capacitor 104 are connected to a first side of the second capacitor 106. In an aspect, the tenth switch $S_{10}$ is formed with two insulated gate bipolar transistors (IGBTs) with the emitters connected in series, as shown in FIG. 1.

As shown in FIG. 1, a first side of the eleventh switch $S_{11}$, a second side of the fifth switch $S_5$, and a second side of the eighth switch $S_8$ are connected to a second side of the second capacitor 106.

In an operative aspect, the first side of the first switch $S_1$, the third switch $S_3$, the fifth switch $S_5$, the eighth switch $S_8$, and the ninth switch $S_9$ are collectors of the switches. In an aspect, the second side of the first switch $S_1$, the third switch $S_3$, the fifth switch $S_5$, the eighth switch $S_8$, and the ninth switch $S_9$ are emitters of the corresponding switches.

In an aspect, the second side of the second switch $S_2$, the fourth switch $S_4$, the sixth switch $S_6$, the seventh switch $S_7$, and the eleventh switch $S_{11}$ are collectors of the switches. In an aspect, the first side of the second switch $S_2$, the fourth switch $S_4$, the sixth switch $S_6$, the seventh switch $S_7$, and the eleventh switch $S_{11}$ are emitters of the corresponding switches.

The first capacitor 104, and the second capacitor 106 are connected in series. Further, the first capacitor 104 and the second capacitor 106 are connected in parallel with the direct current source 102. In an example, the first capacitor 104 and the second capacitor 106 have a capacitor inrush current of less than 5 amperes at a max capacitance of 1700 µF and an input voltage to the circuit of 100 V.

In an example, the first side of the first capacitor 104 is an anode and the first side of the second capacitor 106 is an anode.

In another example, the second side of the first capacitor 104 is a cathode and the second side of the second capacitor 106 is a cathode.

In an aspect, the circuit 100 is coupled to a storage device and the load 108. For example, the load 108 may be a DC load or an AC load. In an example, the DC load is selected from a group consisting of a battery, an electric vehicle, a pump, a compressor, a heater, a cathodic protection device, a DC to DC converter, and an electrolyzer. In one example, the AC load is selected from a group consisting of a pump, a compressor, a heater, and a transformer.

The circuit 100 is configured to produce a boosted output voltage of 1.25. The circuit 100 utilizes 12 IGBTs. For example, the rating of the plurality of switches ($S_1$-$S_{11}$) is shown along with the switches as shown in FIG. 1. As the capacitor inrush current is reduced by a large factor, the durability of the circuit 100 increases, especially in high-temperature operations.

Figure 2A:
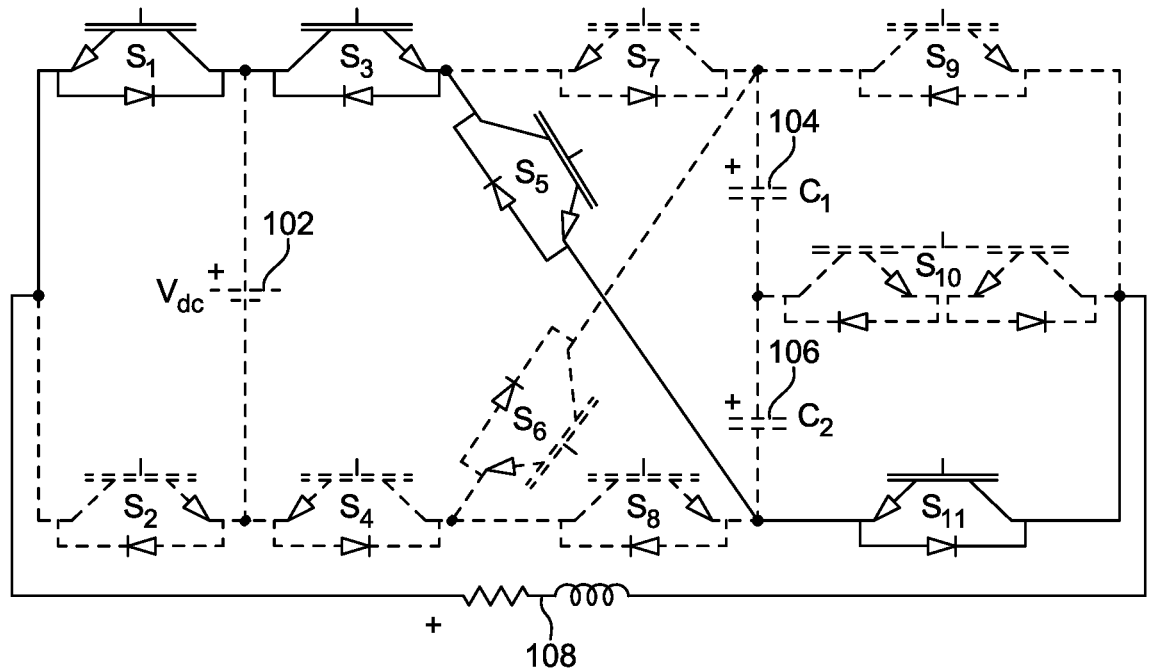
FIG. 2A illustrates a first state of the inverter topology circuit at 0 $V_{dc}$, according to aspects of the present disclosure.
Figure 2B:
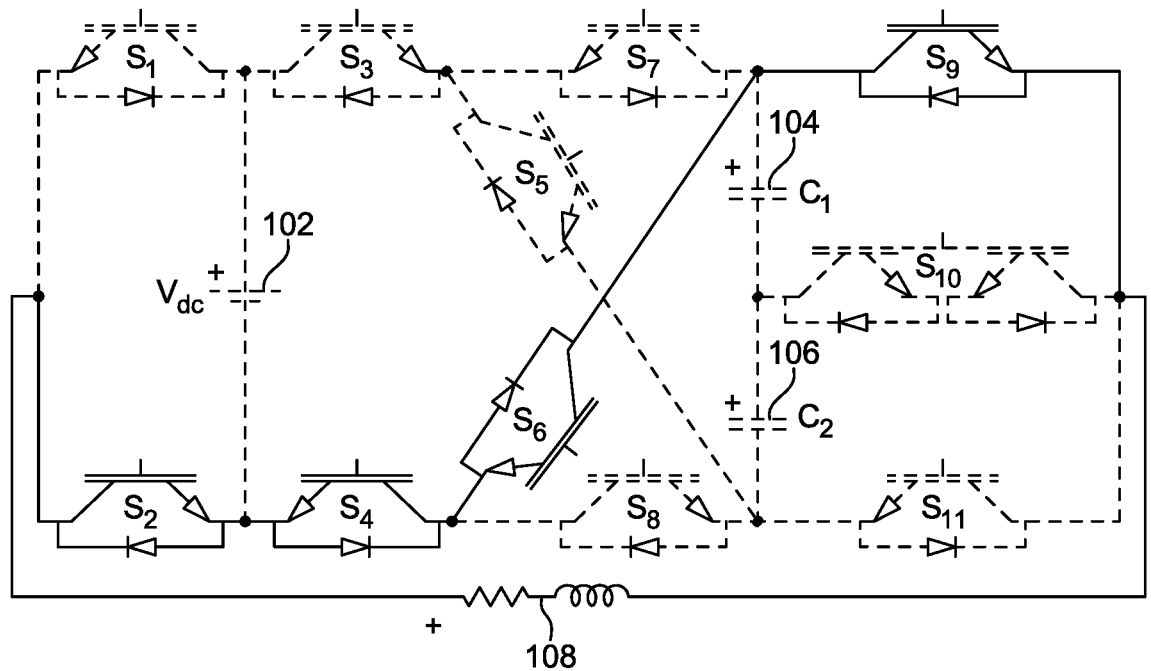
FIG. 2B illustrates a second state of the inverter topology circuit at 0 V, according to aspects of the present disclosure.
Figure 2C:
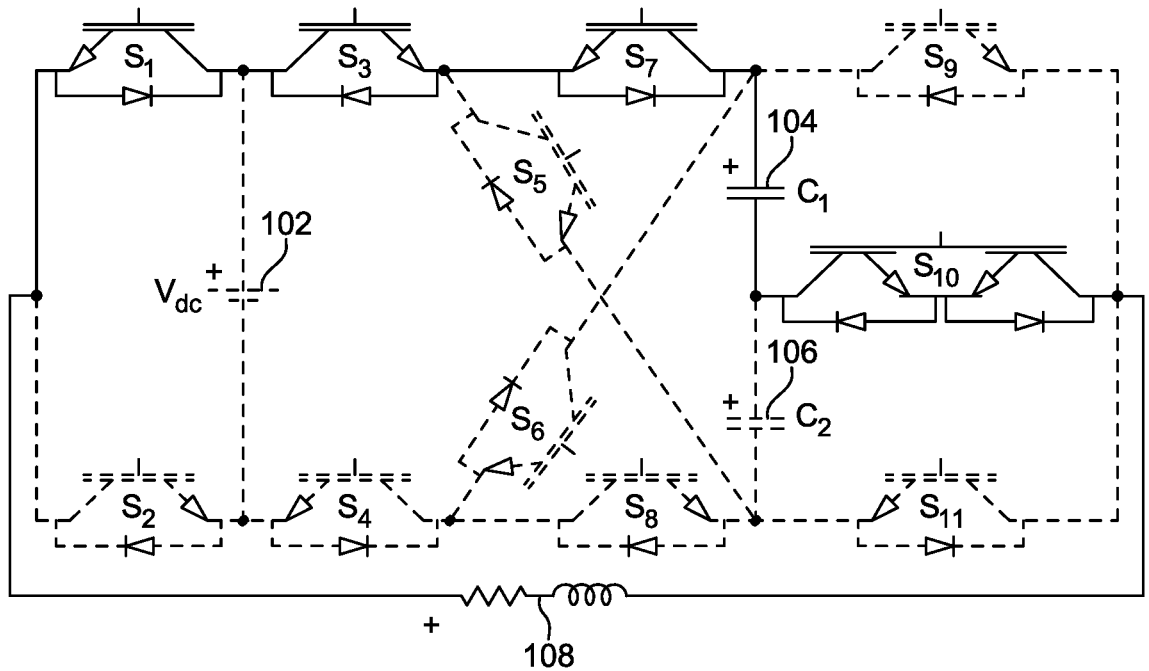
FIG. 2C illustrates a third state of the inverter topology circuit at 0.25 $V_{dc}$, according to aspects of the present disclosure.
Figure 2D:
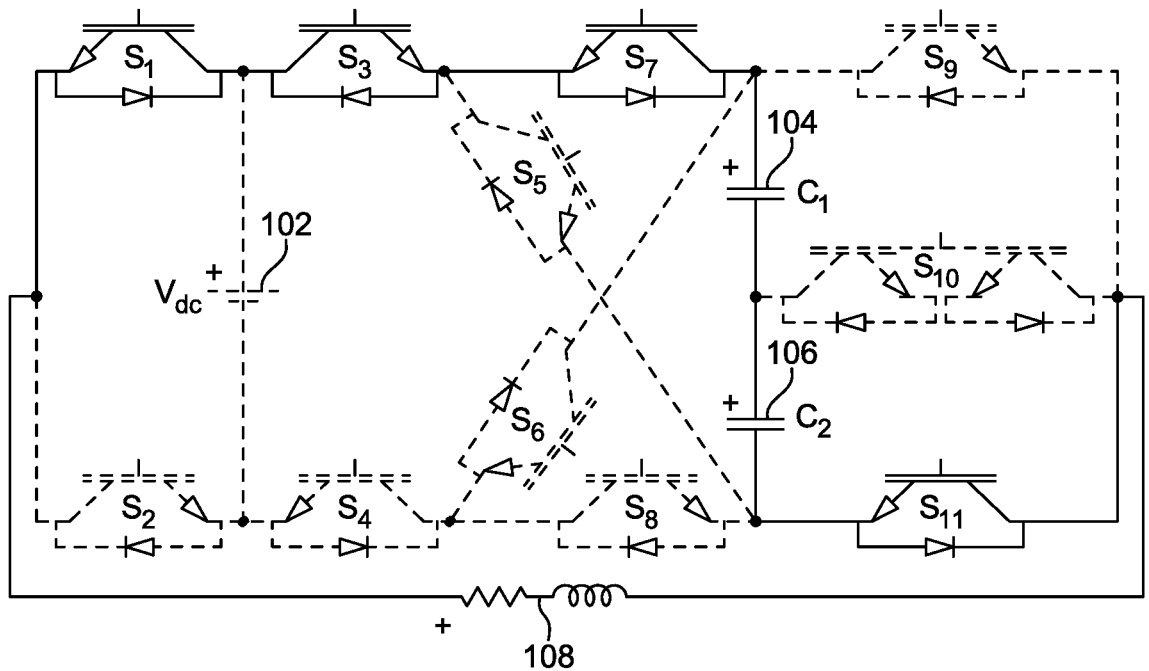
FIG. 2D illustrates a fourth state of the inverter topology circuit at 0.5 $V_{dc}$, according to aspects of the present disclosure.
Figure 2E:
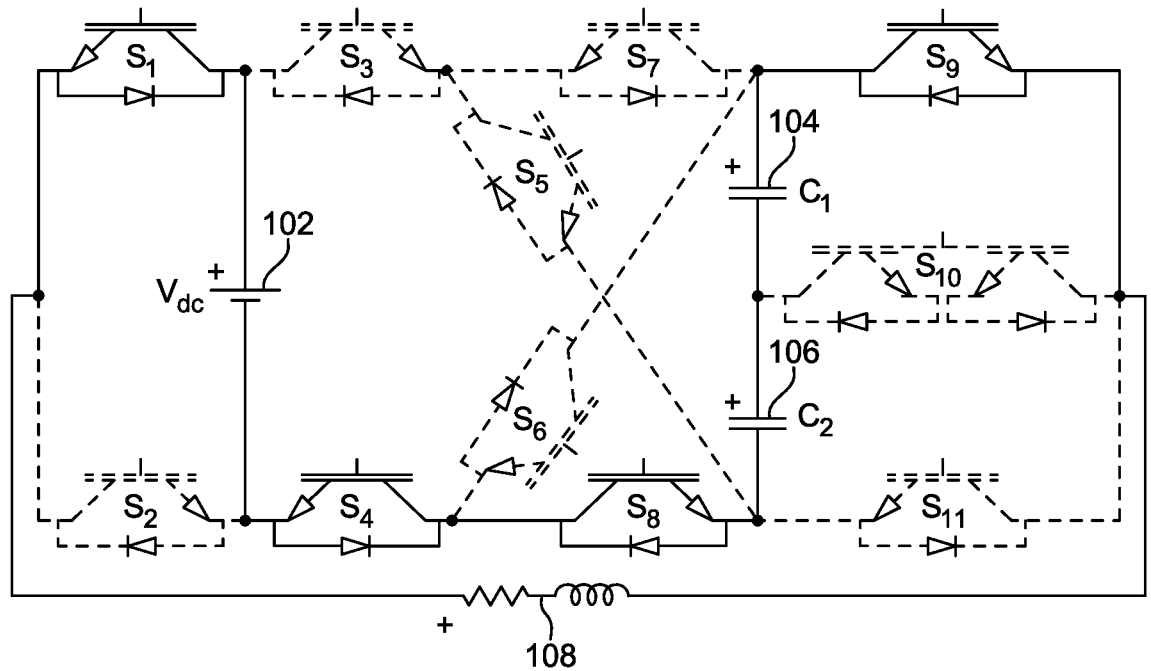
FIG. 2E illustrates a fifth state of the inverter topology circuit at 0.5 $V_{dc}$, according to aspects of the present disclosure.
Figure 2F:
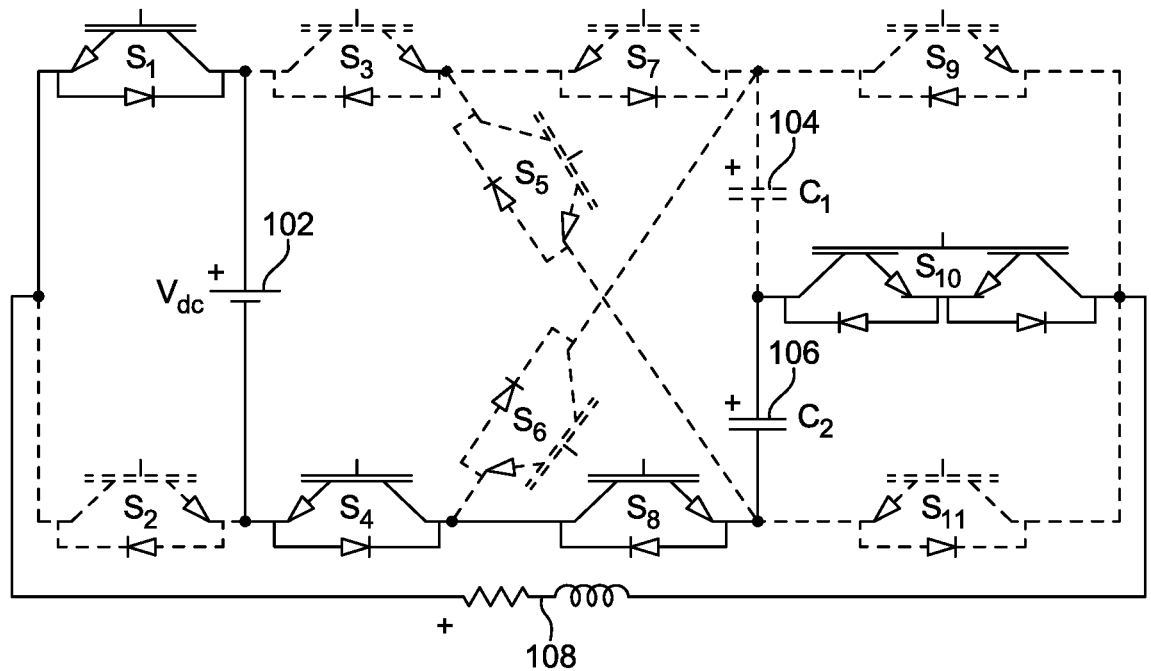
FIG. 2F illustrates a sixth state of the inverter topology circuit at 0.75 $V_{dc}$, according to aspects of the present disclosure.
Figure 2G:
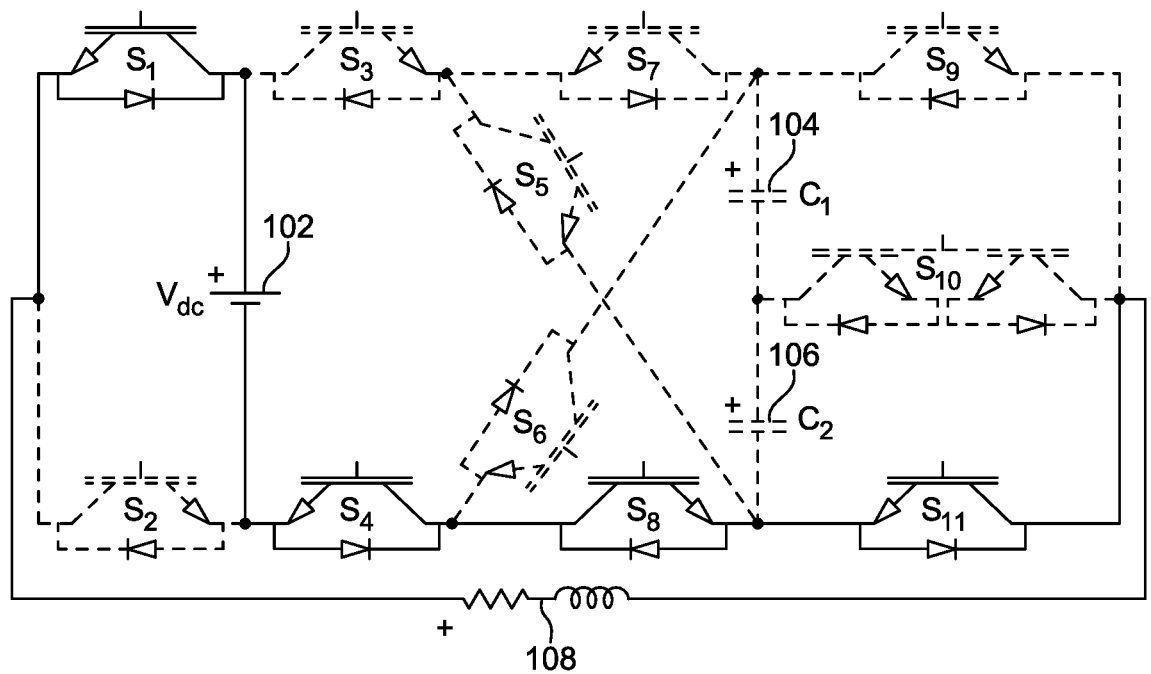
FIG. 2G illustrates a seventh state of the inverter topology circuit at $V_{dc}$, according to aspects of the present disclosure.
Figure 2H:
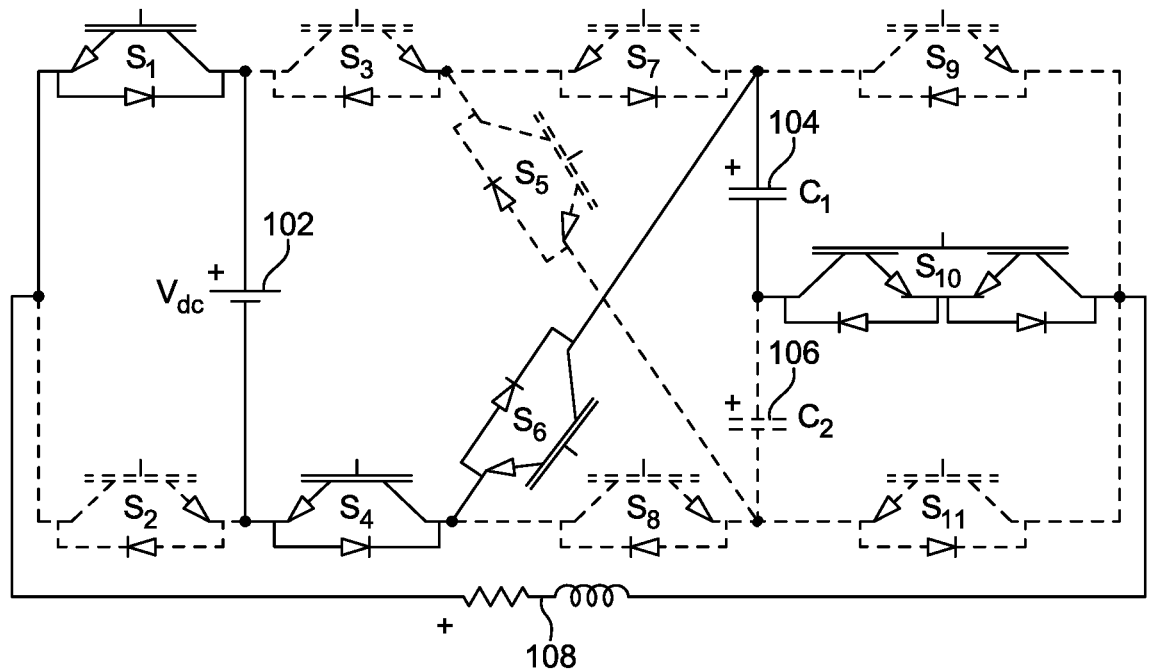
FIG. 2H illustrates an eighth state of the inverter topology circuit at 1.25 $V_{dc}$, according to aspects of the present disclosure.
Figure 2I:
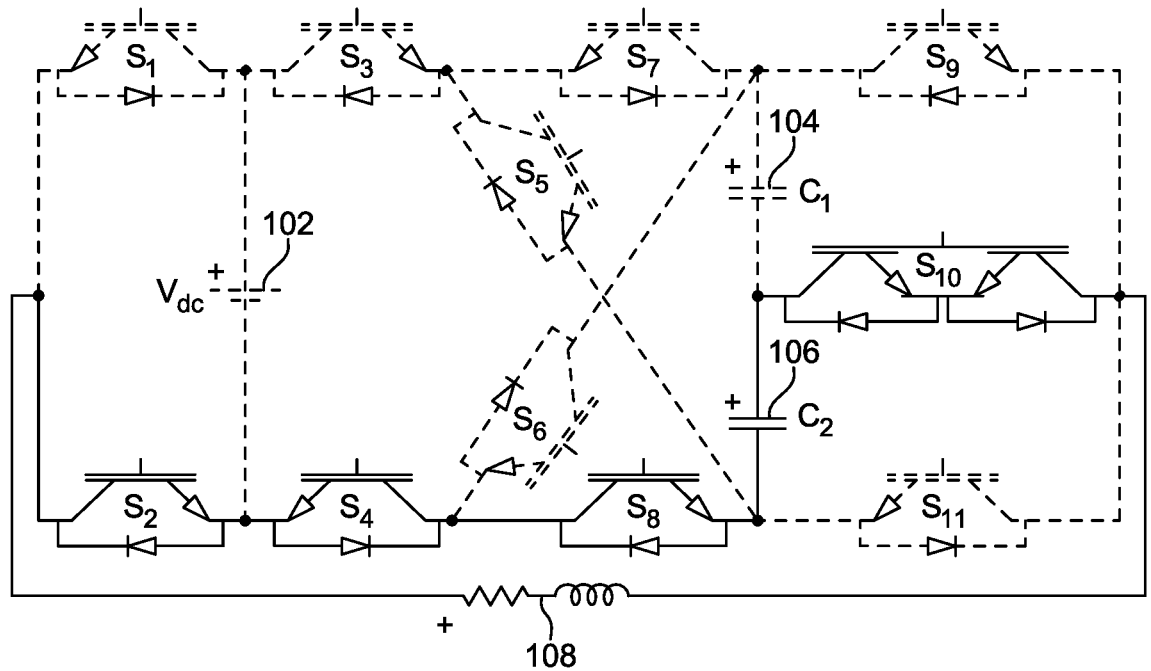
FIG. 2I illustrates a ninth state of the inverter topology circuit at −0.25 $V_{dc}$, according to aspects of the present disclosure.
Figure 2J:
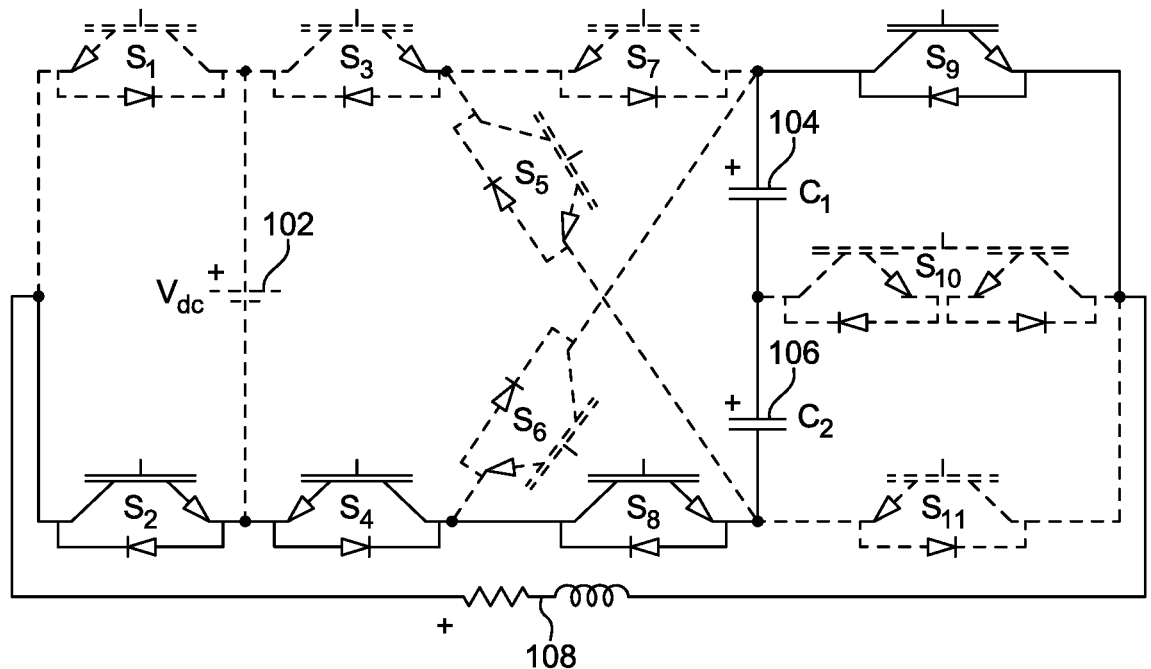
FIG. 2J illustrates a tenth state of the inverter topology circuit at −0.5 $V_{dc}$, according to aspects of the present disclosure.
Figure 2K:
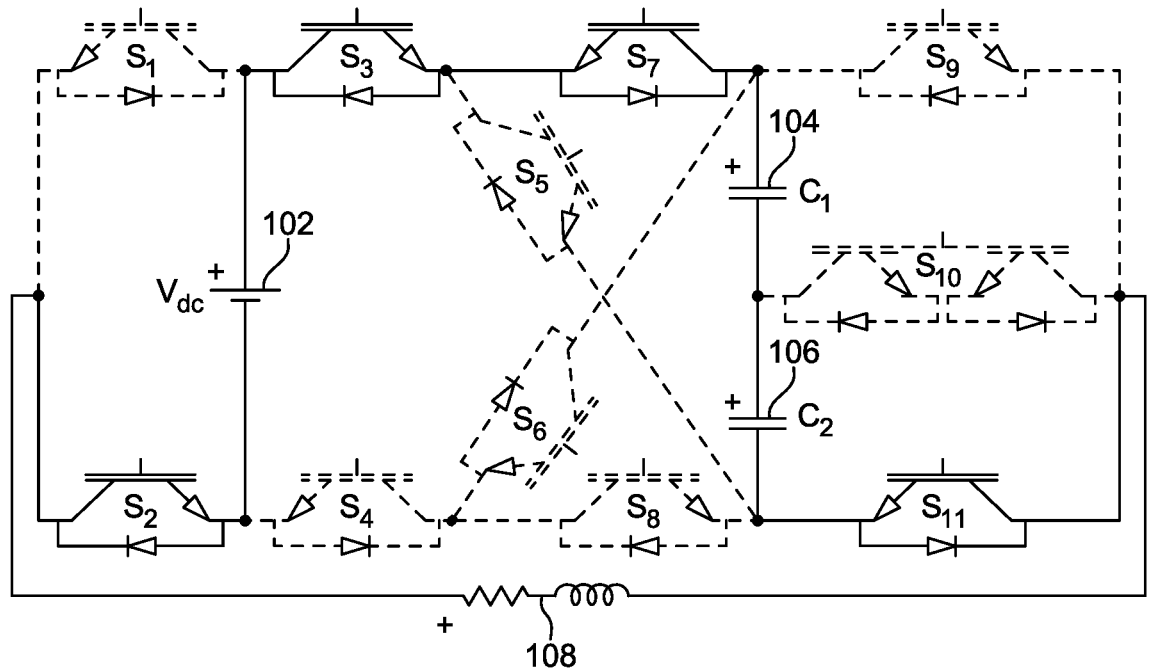
FIG. 2K illustrates an eleventh state of the inverter topology circuit at −0.5 $V_{dc}$, according to aspects of the present disclosure.
Figure 2L:
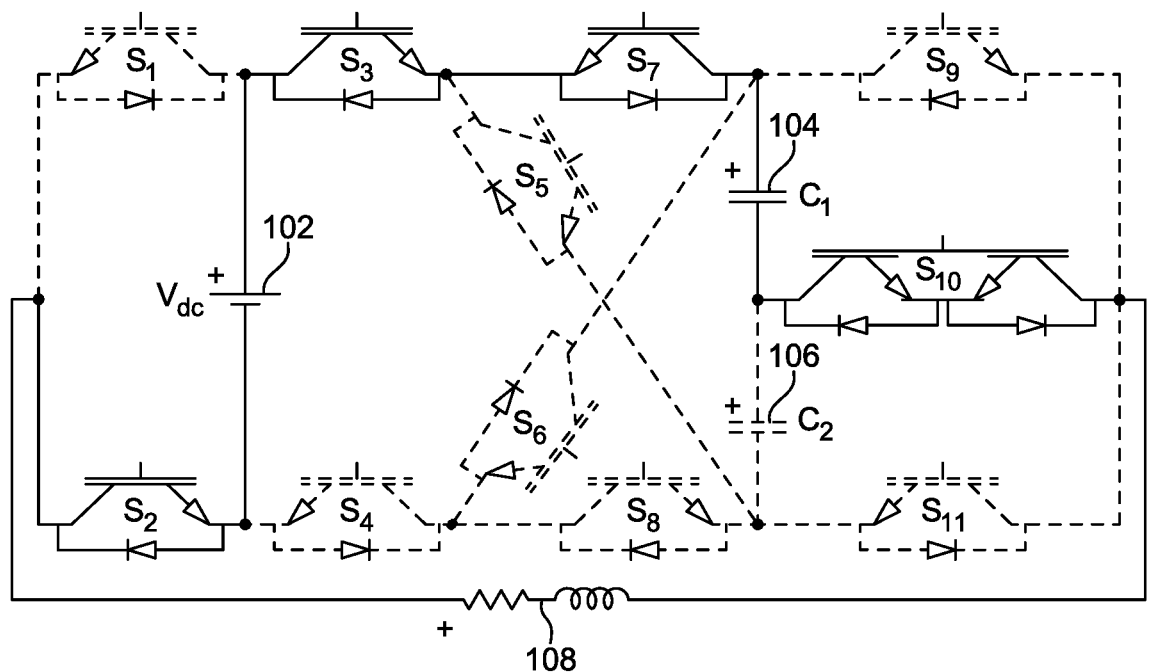
FIG. 2L illustrates a twelfth state of the inverter topology circuit at −0.75 $V_{dc}$, according to aspects of the present disclosure.
Figure 2M:
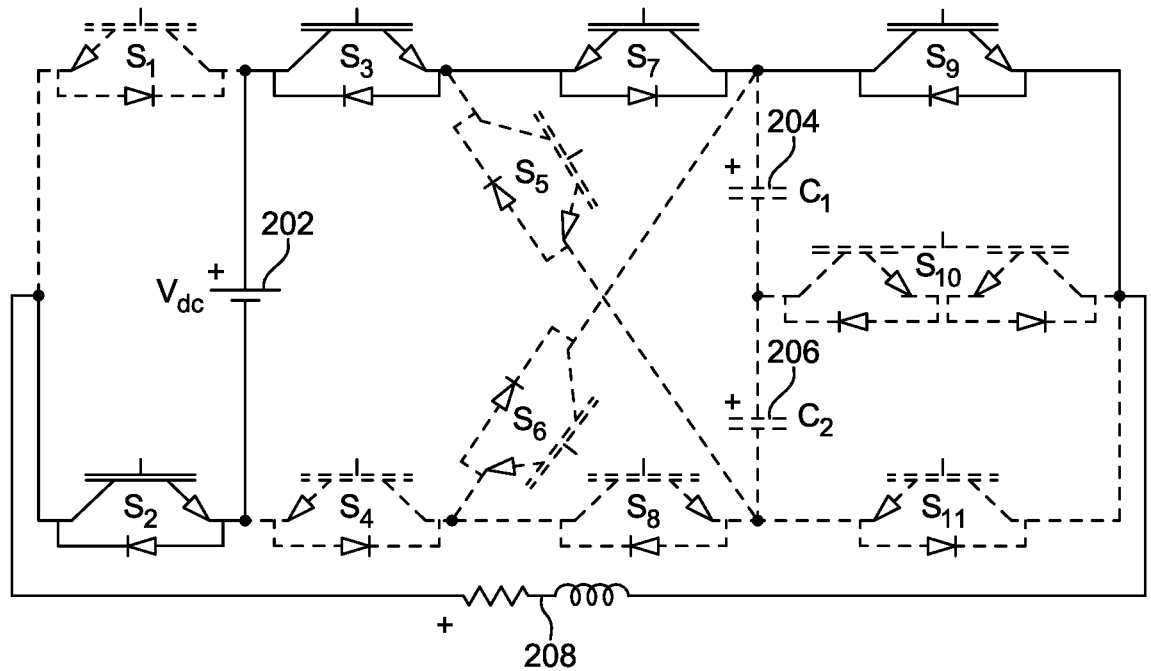
FIG. 2M illustrates a thirteenth state of the inverter topology circuit at −$V_{dc}$, according to aspects of the present disclosure.
Figure 2N:
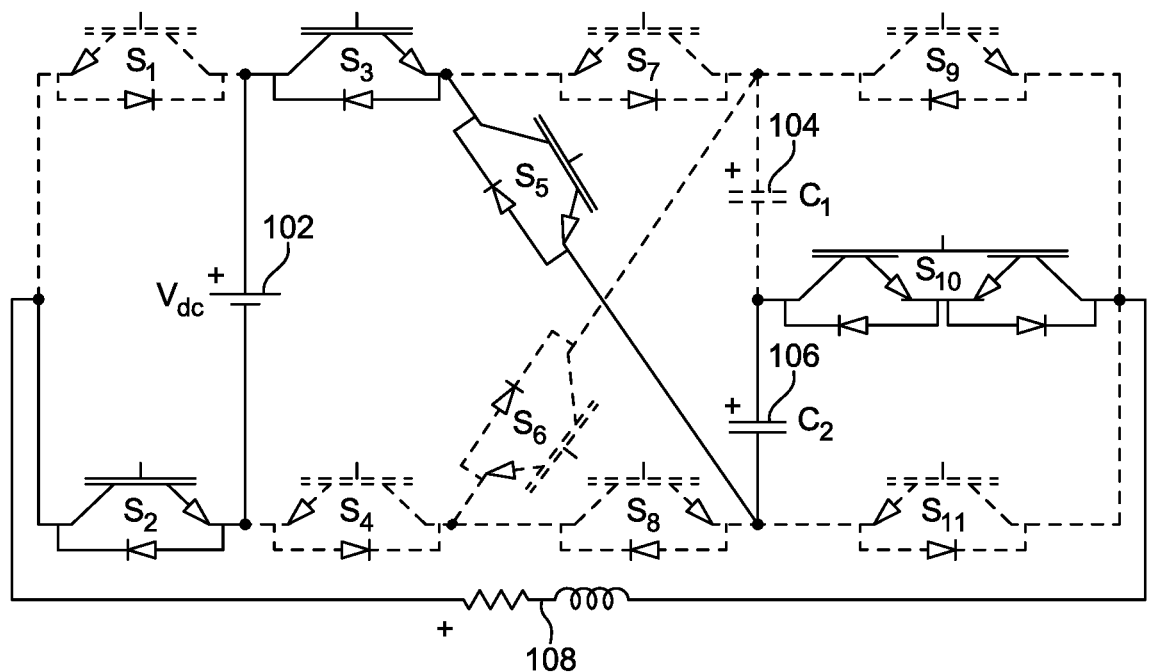
FIG. 2N illustrates a fourteenth state of the inverter topology circuit at −1.25 $V_{dc}$, according to aspects of the present disclosure.

FIG. 2A-FIG. 2N illustrate various operational states of the circuit 100 (also refers as an inverter 100), according to aspects of the present disclosure.

FIG. 2A illustrates a first state of the inverter 100 at 0 $V_{dc}$ (state 1 as shown in Table 1), where the switches $S_1$, $S_3$, $S_5$, and $S_{11}$ are ON and switches $S_2$, $S_4$, $S_6$, $S_7$, $S_8$, $S_9$, and $S_{10}$, are OFF. FIG. 2B illustrates a second state of the inverter 100 at 0 V (state2 as shown in Table 1), where the switches $S_2$, $S_4$, $S_6$, and $S_9$ are ON and switches $S_1$, $S_3$, $S_5$, $S_7$, $S_8$, $S_{10}$, and $S_{11}$, are OFF.

FIG. 2C illustrates a third state of the inverter 100 at 0.25 $V_{dc}$ (state 3 as shown in Table 1), where the switches $S_1$, $S_3$, $S_7$, and $S_{10}$ are ON and switches $S_2$, $S_4$, $S_5$, $S_6$, $S_8$, $S_9$, and $S_{11}$, are OFF. FIG. 2D illustrates a fourth state of the inverter 100 at 0.5 $V_{dc}$ (state 4 as shown in Table 1), where the switches $S_1$, $S_3$, $S_7$, and $S_{11}$ are ON and switches $S_2$, $S_4$, $S_5$, $S_6$, $S_8$, $S_9$, and $S_{10}$, are OFF.

FIG. 2E illustrates a fifth state of the inverter 100 at 0.5 $V_{dc}$ (state 5 as shown in Table 1), where the switches $S_1$, $S_4$, $S_8$, and $S_9$ are ON and switches $S_2$, $S_3$, $S_5$, $S_6$, $S_7$, $S_{10}$, and $S_{11}$, are OFF. FIG. 2F illustrates a sixth state of the inverter 100 at 0.75 $V_{dc}$ (which is state 6 as shown in Table 1), where the switches $S_1$, $S_4$, $S_8$, and $S_{10}$ are ON and switches $S_2$, $S_3$, $S_5$, $S_6$, $S_7$, $S_9$, and $S_{11}$, are OFF.

FIG. 2G illustrates a seventh state of the inverter 100 at $V_{dc}$ (state 7 as shown in Table 1), where the switches $S_1$, $S_4$, $S_8$, and $S_{11}$ are ON and switches $S_2$, $S_3$, $S_5$, $S_6$, $S_7$, $S_9$, and $S_{10}$, are OFF. FIG. 2H illustrates an eighth state of the inverter 100 at 1.25 $V_{dc}$ (state 8 as shown in Table 1), where the switches $S_1$, $S_4$, $S_6$, and $S_{10}$ are ON and switches $S_2$, $S_3$, $S_5$, $S_7$, $S_8$, $S_9$, and $S_{11}$, are OFF.

FIG. 2I illustrates a ninth state of the inverter 100 at −0.25 $V_{dc}$ (state 9 as shown in Table 1), where the switches $S_2$, $S_4$, $S_8$, and $S_{10}$ are ON and switches $S_1$, $S_3$, $S_5$, $S_6$, $S_7$, $S_9$, and $S_{11}$, are OFF. FIG. 2J illustrates a tenth state of the inverter 100 at −0.5 $V_{dc}$ (state 10 as shown in Table 1), where the switches $S_2$, $S_4$, $S_8$, and $S_9$ are ON and switches $S_1$, $S_3$, $S_5$, $S_6$, $S_7$, $S_{10}$, and $S_{11}$, are OFF.

FIG. 2K illustrates an eleventh state of the inverter 100 at −0.5 $V_{dc}$ (state 11 as shown in Table 1), where the switches $S_2$, $S_3$, $S_7$, and $S_{11}$ are ON and switches $S_1$, $S_4$, $S_5$, $S_6$, $S_8$, $S_9$, and $S_{10}$, are OFF. FIG. 2L illustrates a twelfth state of the inverter 100 at −0.75 $V_{dc}$ (state 12 as shown in Table 1), where the switches $S_2$, $S_3$, $S_7$, and $S_{10}$ are ON and switches $S_1$, $S_4$, $S_5$, $S_6$, $S_8$, $S_9$, and $S_{11}$, are OFF.

FIG. 2M illustrates a thirteenth state of the inverter 100 at −$V_{dc}$ (state 13 as shown in Table 1), where the switches $S_2$, $S_3$, $S_7$, and $S_9$ are ON and switches $S_1$, $S_4$, $S_5$, $S_6$, $S_8$, $S_{10}$, and $S_{11}$, are OFF. FIG. 2N illustrates a fourteenth state of the inverter 100 at −1.25 $V_{dc}$ (state 14 as shown in Table 1), where the switches $S_2$, $S_3$, $S_5$, and $S_{10}$ are ON and switches $S_1$, $S_4$, $S_6$, $S_7$, $S_8$, $S_9$, and $S_{11}$, are OFF.

Table 1 represents the switching states of the circuit 100 (inverter 100) given as below.

3. The ±0.75 $V_{dc}$ States:

For states ±0.75 $V_{dc}$, a circuit path for the positive and negative cycle, respectively, is shown in FIG. 2F and FIG. 2L. For 0.75 $V_{dc}$ circuit condition, $C_2$ is affected according to the direction of the current, and for −0.75 $V_{dc}$ condition, $C_1$ charges or discharges.

4. The ±$V_{dc}$ States:

In these conditions, the capacitor's charge remains unaffected by any direction of flow of current. This is shown in FIG. 2G and FIG. 2M for positive and negative cycle, respectively.

5. The ±1.25 $V_{dc}$ States:

For 1.25 $V_{dc}$, as shown in FIG. 2H, with positive current, $C_1$ will discharge, and vice-versa. The capacitor $C_2$ charges and discharges for the state −1.25$V_{dc}$, as shown in FIG. 2N.

Figure 3:
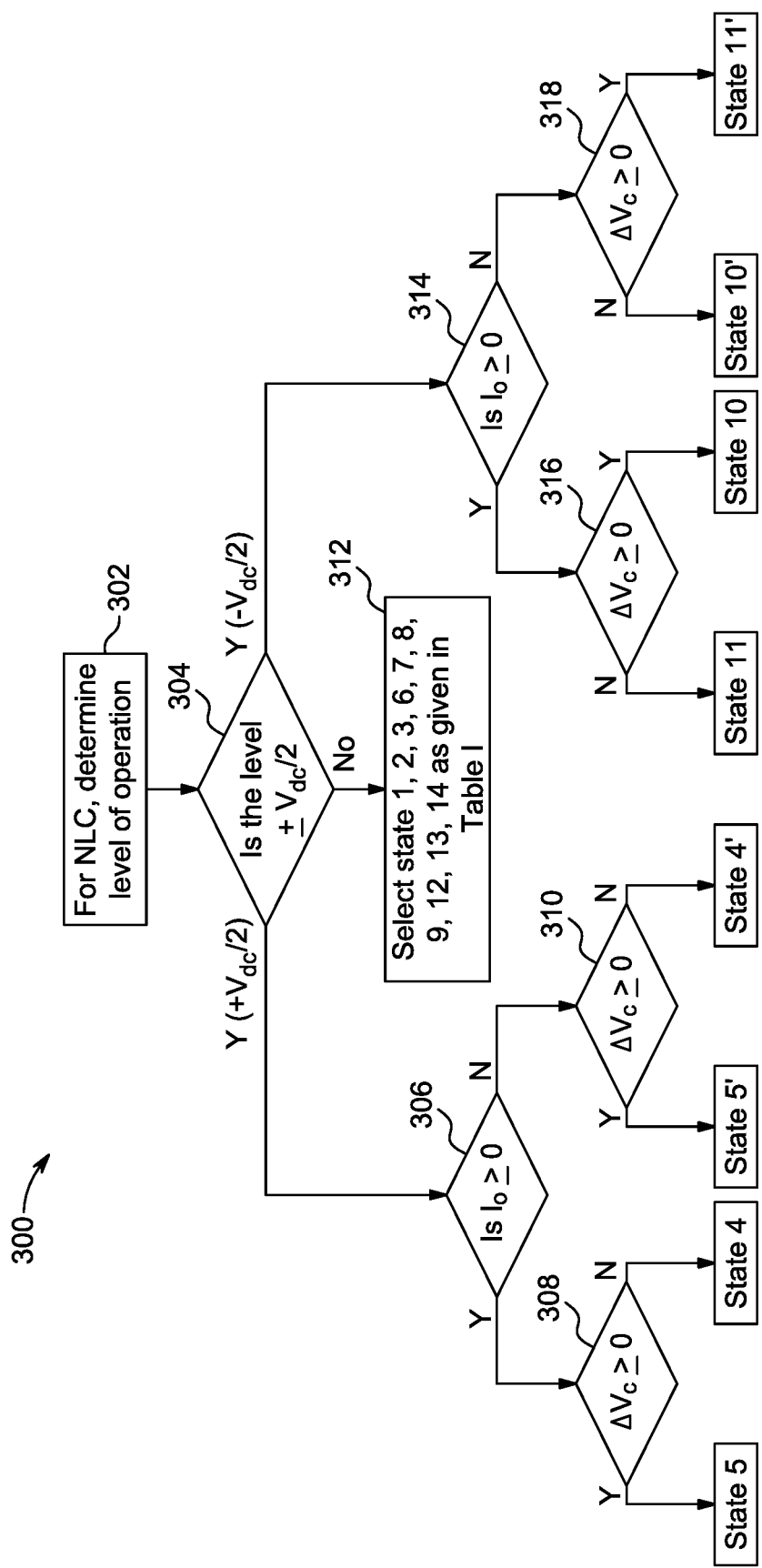
FIG. 3 illustrates a method for controlling the charging and discharging of a first capacitor and a second capacitor in an inverter, according to aspects of the present disclosure.

FIG. 3 illustrates a method 300 for controlling the charging and discharging of the first capacitor 204 and the second capacitor 206 in the inverter 100, according to aspects of the present disclosure. In an aspect, FIG. 3 illustrates state selection using the redundant states (according to Table-1).

Step 302 includes determining a state of the inverter 100 by a nearest-level control (NLC) technique. The NLC technique is a technique used in modular multilevel converters (MMCs) with a large number of submodules (SMs). In the present disclosure, the circuit 100 (inverter 100) is configured to determine the state of the inverter 100 by using the

TABLE 1

Switching states of the inverter 100.

| State | $S_1$ | $S_3$ | $S_5$ | $S_6$ | $S_7$ | $S_8$ | $S_9$ | $S_{10}$ | $S_{11}$ | $I_o$ | $C_1$ | $C_2$ | $V_o$ |
|---|---|---|---|---|---|---|---|---|---|---|---|---|---|
| 1. | 1 | 1 | 1 | 0 | 0 | 0 | 0 | 0 | 1 | + | — | — | 0 |
| 2. | 0 | 0 | 0 | 1 | 0 | 0 | 1 | 0 | 0 | + | — | — | 0 |
| 3. | 1 | 1 | 0 | 0 | 1 | 0 | 0 | 1 | 0 | + | D | — | $V_{dc}/4$ |
| 4. | 1 | 1 | 1 | 0 | 1 | 0 | 0 | 0 | 1 | + | D | D | $V_{dc}/2$ |
| 5. | 1 | 0 | 0 | 0 | 0 | 1 | 1 | 0 | 0 | + | C | C | $V_{dc}/2$ |
| 6. | 1 | 0 | 0 | 0 | 0 | 1 | 0 | 1 | 0 | + | — | C | $3 V_{dc}/4$ |
| 7. | 1 | 0 | 0 | 0 | 1 | 0 | 0 | 1 | 0 | + | — | — | $V_{dc}$ |
| 8. | 1 | 0 | 0 | 1 | 0 | 0 | 0 | 1 | 0 | + | D | — | $5 V_{dc}/4$ |
| 9. | 0 | 0 | 0 | 0 | 0 | 1 | 0 | 1 | 0 | + | — | C | −$V_{dc}/4$ |
| 10. | 0 | 0 | 0 | 0 | 0 | 1 | 1 | 0 | 0 | + | C | C | −$V_{dc}/2$ |
| 11. | 0 | 1 | 0 | 0 | 1 | 0 | 0 | 0 | 1 | + | D | D | −$V_{dc}/2$ |
| 12. | 0 | 1 | 0 | 0 | 1 | 0 | 0 | 1 | 0 | + | D | — | −$3 V_{dc}/4$ |
| 13. | 0 | 1 | 0 | 0 | 1 | 0 | 1 | 0 | 0 | + | — | — | −$V_{dc}$ |
| 14. | 0 | 1 | 1 | 0 | 0 | 0 | 0 | 1 | 0 | + | — | C | −$5 V_{dc}/4$ |
| 1'. | 1 | 0 | 0 | 1 | 0 | 0 | 0 | 1 | 0 | − | C | — | $5 V_{dc}/4$ |
| 2'. | 1 | 0 | 0 | 0 | 0 | 1 | 0 | 0 | 1 | − | — | — | $V_{dc}$ |
| 3'. | 1 | 0 | 0 | 0 | 0 | 1 | 0 | 1 | 0 | − | — | D | $3 V_{dc}/4$ |
| 4'. | 1 | 0 | 0 | 0 | 0 | 1 | 1 | 0 | 0 | − | D | D | $V_{dc}/2$ |
| 5'. | 1 | 1 | 0 | 0 | 1 | 0 | 0 | 0 | 1 | − | C | C | $V_{dc}/2$ |
| 6'. | 1 | 1 | 0 | 0 | 1 | 0 | 0 | 1 | 0 | − | C | — | $V_{dc}/4$ |
| 7'. | 1 | 1 | 1 | 0 | 0 | 0 | 0 | 0 | 1 | − | — | — | 0 |
| 8'. | 0 | 0 | 0 | 1 | 0 | 0 | 1 | 0 | 0 | − | — | — | 0 |
| 9'. | 0 | 0 | 0 | 0 | 0 | 1 | 0 | 1 | 0 | − | — | D | −$V_{dc}/4$ |
| 10'. | 0 | 0 | 0 | 0 | 0 | 1 | 1 | 0 | 0 | − | D | D | −$V_{dc}/2$ |
| 11'. | 0 | 1 | 0 | 0 | 1 | 0 | 0 | 0 | 1 | − | C | C | −$V_{dc}/2$ |
| 12'. | 0 | 1 | 0 | 0 | 1 | 0 | 0 | 1 | 0 | − | C | — | −$3 V_{dc}/4$ |
| 13'. | 0 | 1 | 0 | 0 | 1 | 0 | 1 | 0 | 0 | − | — | — | −$V_{dc}$ |
| 14'. | 0 | 1 | 1 | 0 | 0 | 0 | 0 | 1 | 0 | − | — | D | −$5 V_{dc}/4$ |

1. The ±0.25 $V_{dc}$ states:

At 0.25 $V_{dc}$, $C_1$ discharges with positive current, and charges with negative current (as shown in FIG. 2C). At −0.25$V_{dc}$, as shown in Table 1 and FIG. 2I, $C_2$ discharges with positive current and charges with negative current, respectively. The charge on $C_2$ at 0.25$V_{dc}$ and $C_1$ at −0.25$V_{dc}$ is remain unaltered.

2. The ±0.5 $V_{dc}$ States:

At 0.5 $V_{dc}$ level, the inverter 100 has several redundant states. There are four configurations as shown by conditions in FIG. 2D, FIG. 2E, FIG. 2J, and FIG. 2K.

NLC technique. Step 302 further includes determining a DC link voltage $V_{dc}$ of the inverter 100. Step 302 further includes determining a direction of current flow and determining a magnitude of an auxiliary DC link voltage. The inverter 100 also determines a threshold of the auxiliary DC link voltage ($\Delta V_C$). For example, the threshold of the auxiliary DC link voltage is 50V.

The controllable charging and discharging of the capacitors can be performed according to the magnitude of the auxiliary DC-link voltage and the direction of the flow of current.

Step 304 includes determining if the determined state is $+V_{dc}/2$ or $-V_{dc}/2$.

Step 306 includes, if the determined state is $+V_{dc}/2$, determining whether the current is positive ($I_0 \geq 0$) or not. If the determined current is positive ($I_0 \geq 0$), the method 300 will go to step 308. If the determined current is negative ($I_0 \leq 0$), the method 300 will go to step 310.

Step 308 includes determining if the auxiliary DC link voltage is lower than the threshold ($\Delta V_C \geq 0$) or not.

In response to the state level being $+V_{dc}/2$, the current flow being positive ($I_0 \geq 0$), and the magnitude of the auxiliary DC link voltage being higher than the threshold ($\Delta V_C \geq 0$), step 308 further includes charging the first capacitor 104 and the second capacitor 106. For example, if the current is positive ($I_0 \geq 0$) and the auxiliary DC-link voltage is above 50 V, then state 5 (as shown in table 1) will be chosen to charge the capacitors, as shown in FIG. 3.

In response to the state level being $+V_{dc}/2$, the current flow being positive ($I_0 \geq 0$), and the magnitude of the auxiliary DC link voltage being lower than the threshold ($\Delta V_C < 0$), step 308 further includes discharging the first capacitor 104 and the second capacitor 106. If the value of the auxiliary DC-link voltage is below 50 V, then the circuit 100 will select state 4 (as shown in table 1) to discharge the capacitors through the load 208, as shown in FIG. 3.

Step 310, if the determined current is negative ($I_0 < 0$), includes determining if the auxiliary DC link voltage is lower than the threshold or not ($\Delta V_C \geq 0$).

In response to the state level being $+V_{dc}/2$, the current flow being negative ($I_0 < 0$), and the magnitude of the auxiliary DC link voltage being lower than the threshold ($\Delta V_C < 0$), step 310 further includes discharging the first capacitor 104 and the second capacitor 106. If the determined current is negative ($I_0 < 0$) and the auxiliary DC-link voltage is below 50 V, then state 4' (as shown in table 1) will be chosen to discharge the capacitors.

In response to the state level being $+V_{dc}/2$, the current flow being negative ($I_0 < 0$), and the magnitude of the auxiliary DC link voltage being higher than the threshold ($\Delta V_C \geq 0$), step 310 further includes charging the first capacitor 104 and the second capacitor 106. If the value of the magnitude of the auxiliary DC link voltage is above 50 V, then the circuit 100 will select state 5' (as shown in table 1) to charge the capacitors through the load 108.

If the determined state has a different value from the $V_{dc}/2$ or $-V_{dc}/2$, then step 312 will be performed. The states shown in FIG. 2A, FIG. 2B, FIG. 2C, FIG. 2F, FIG. 2G, FIG. 2H, FIG. 2I, FIG. 2L, FIG. 2M and FIG. 2N are normal states, and the charging and discharging of the capacitors cannot be controlled in these states. However, in states $\pm V_{dc}/2$, there are redundant states available.

Step 314, if the determined state is $-V_{dc}/2$, determining whether the current is positive or not. If the determined current is positive ($I_0 \geq 0$), the method 300 will go to step 316. If the determined current is negative ($I_0 < 0$), the method 300 will go to step 318.

Step 316 includes determining if the auxiliary DC link voltage is lower than the threshold or not ($\Delta V_C < 0$).

In response to the state level being $-V_{dc}/2$, the current flow being positive ($I_0 \geq 0$), and the magnitude of the auxiliary DC link voltage being lower than the threshold ($\Delta V_C < 0$), step 316 further includes discharging the first capacitor 104 and the second capacitor 106. For example, if the current is positive and the auxiliary DC-link voltage is below 50 V, then the state 11 (as shown in table 1) will be chosen to discharge the capacitors, as shown in FIG. 3.

In response to the state level being $-V_{dc}/2$, the current flow being positive ($I_0 \geq 0$), and the magnitude of the auxiliary DC link voltage being higher than the threshold ($\Delta V_C \geq 0$), step 316 further includes charging the first capacitor 104 and the second capacitor 106. For example, if the current is positive ($I_0 \geq 0$) and the auxiliary DC-link voltage is above 50 V, then the state 10 (as shown in table 1) will be chosen to charge the capacitors, as shown in FIG. 3.

Step 318, if the determined state is $-V_{dc}/2$ and the determined current is negative ($I_0 < 0$), includes determining if the auxiliary DC link voltage is lower than the threshold or not ($\Delta V_C < 0$).

In response to the state level being $-V_{dc}/2$, the current flow being negative ($I_0 < 0$), and the magnitude of the auxiliary DC link voltage being lower than the threshold, step 318 further includes discharging the first capacitor 104 and the second capacitor 106. For example, if the current is negative and the auxiliary DC-link voltage is below 50 V, then the state 10' (as shown in table 1) will be chosen to discharge the capacitor, as shown in FIG. 3.

In response to the state level being $-V_{dc}/2$, the current flow being negative ($I_0 < 0$), and the magnitude of the auxiliary DC link voltage being higher than the threshold, step 318 further includes charging the first capacitor 104 and the second capacitor 106. For example, if the current is negative and the auxiliary DC-link voltage is above 50 V, then the state 11' (as shown in table 1) will be chosen to charge the capacitor, as shown in FIG. 3.

As compared to a conventional inverter, the present circuit 100 uses IGBTs to replace the two diodes. The present circuit 100 is configured to achieve an enhanced performance by using the redundant states of the inverter. The present circuit 100 is configured to reduce large capacitor inrush currents and switch/diode current stresses.

Examples and Experiments

The following examples are provided to illustrate further and to facilitate the understanding of the present disclosure.

During the first experiment, the present circuit 100 was analyzed and it was observed that the circuit 100 was able to produce an eleven (11) level output corresponding to nine (9) levels synthesized by the conventional inverter, resulting in better output waveforms. The results of the first experiment have been verified and are shown in FIG. 4A-FIG. 4D. In an aspect, due to a greater number of levels in the output, the magnitude of the total harmonic distortion (THD) is lower, leading to a smaller filter requirement.

Figure 4A:
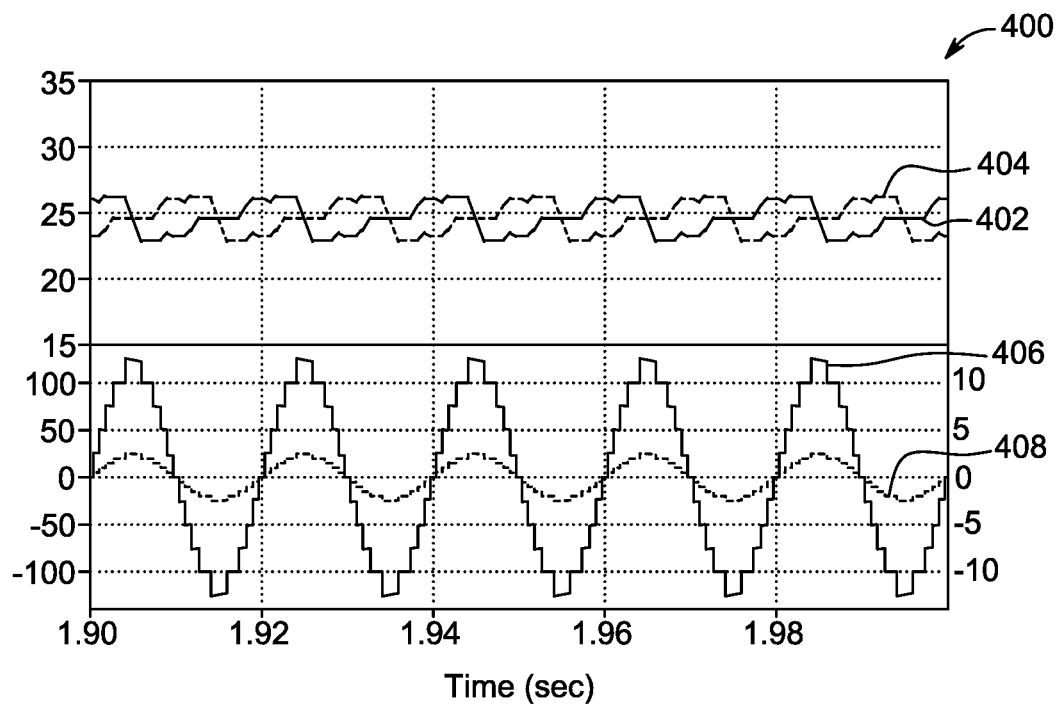
FIG. 4A illustrates a graph of output voltage, load current, and capacitor voltages of the inverter topology circuit with a resistive load (R-load), according to aspects of the present disclosure.

FIG. 4A illustrates a graph 400 of output voltage, load current, and capacitor voltages of the circuit 100 with a resistive load (R-load). In an example, the R-load is 50Ω. Signal 402 indicates the voltage ($VC_1$) across the first capacitor $C_1$ over time. Signal 404 indicates the voltage ($VC_2$) across the second capacitor $C_2$ over time. Signal 406 indicates the output voltage ($V_o$) of the circuit 100. Signal 408 indicates the input current ($I_o$) of the circuit 100.

Figure 4B:
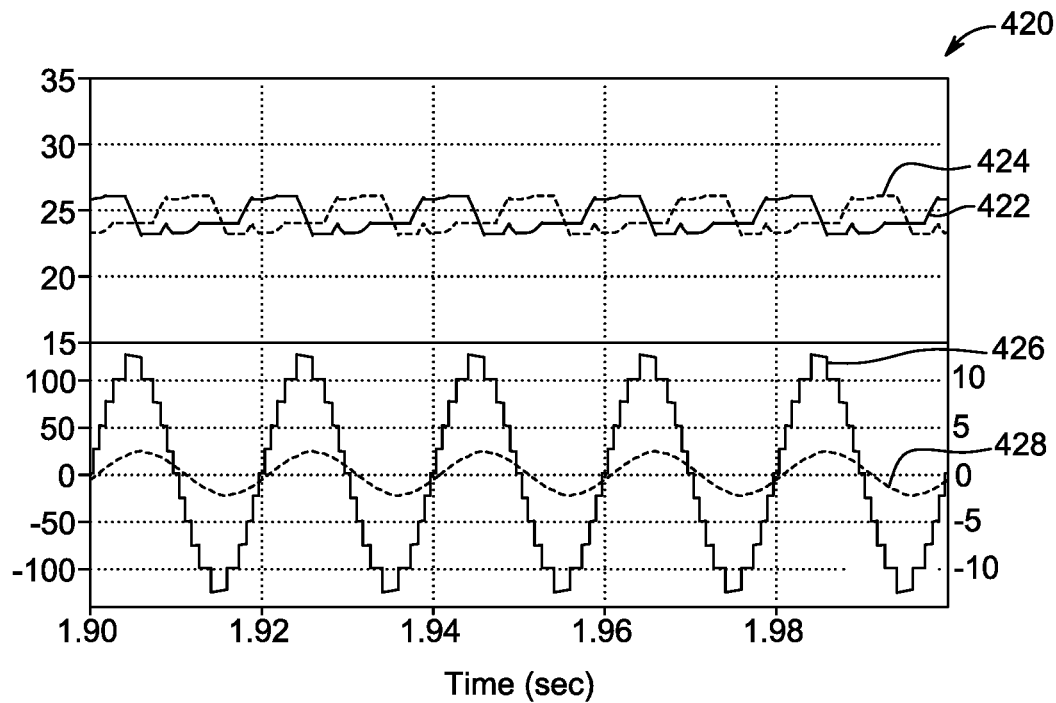
FIG. 4B illustrates a graph of output voltage, load current, and capacitor voltages of the inverter topology circuit with an RL-load, according to aspects of the present disclosure.

FIG. 4B illustrates a graph 420 of output voltage, load current, and capacitor voltages of the circuit with RL-load. In an example, the RL-load is 50Ω, 50 mH. Signal 422 indicates the voltage ($VC_1$) across the first capacitor $C_1$ over the time. Signal 424 indicates the voltage ($VC_2$) across the second capacitor $C_2$ over the time. Signal 426 indicates the output voltage ($V_o$) of the circuit 100. Signal 428 indicates the input current ($I_o$) of the circuit 100.

Figure 4C:
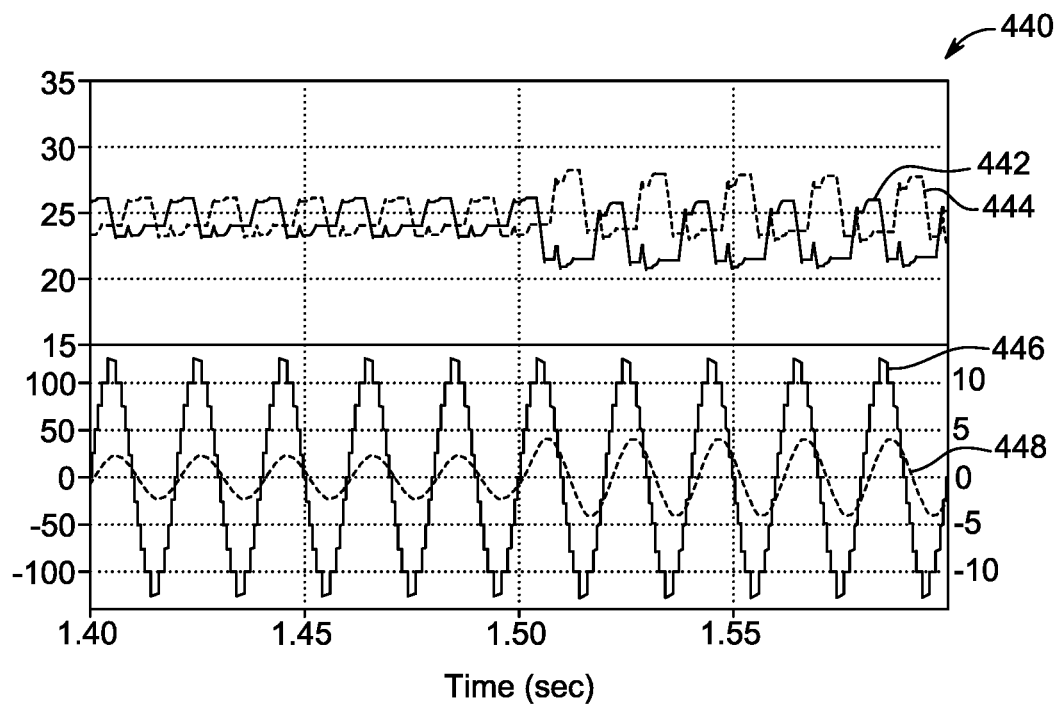
FIG. 4C illustrates a graph of output voltage, load current, and capacitor voltages of the inverter topology circuit with load change, according to aspects of the present disclosure.

FIG. 4C illustrates a graph 440 of output voltage, load current and capacitor voltages of the circuit 100 with load change. In an example, the load change from 50 Ω, 50 mH to 25 Ω, 50 mH. Signal 442 indicates the voltage ($VC_1$) across the first capacitor $C_1$ over time. Signal 444 indicates the voltage ($VC_2$) across the second capacitor $C_2$ over time. Signal 446 indicates the output voltage ($V_o$) of the circuit 100. Signal 448 indicates the input current ($I_o$) of the circuit 100.

Figure 4D:
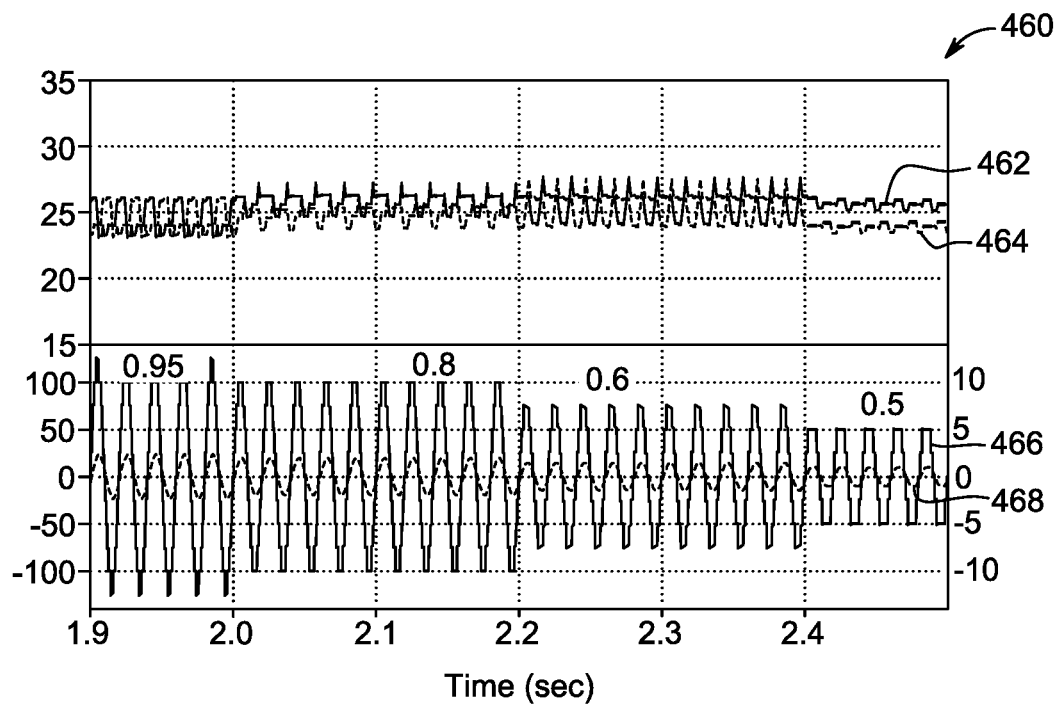
FIG. 4D illustrates a graph of output voltage, load current, and capacitor voltages of the inverter topology circuit with modulation index change, according to aspects of the present disclosure.

FIG. 4D illustrates a graph 460 of output voltage, load current and capacitor voltages of the circuit with modulation index change. A modulation index is defined as the ratio of a fundamental component amplitude of the inverter output voltage to one-half of the available DC bus voltage. Signal 462 indicates the voltage ($VC_1$) across the first capacitor $C_1$ over the time. Signal 464 indicates the voltage ($VC_2$) across the second capacitor $C_2$ over the time. Signal 466 indicates the output voltage ($V_o$) of the circuit 100. Signal 468 indicates the input current ($I_o$) of the circuit 100.

Figure 5A:
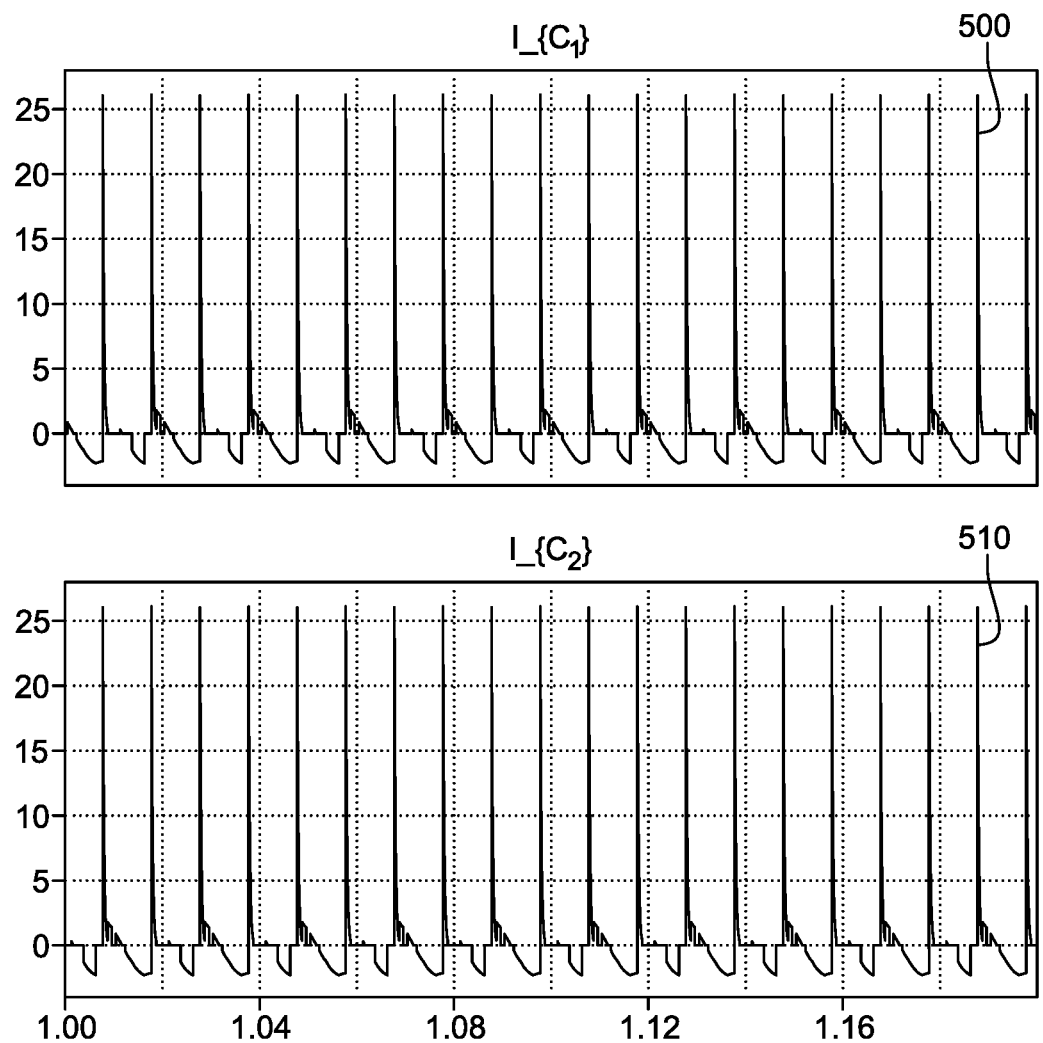
FIG. 5A illustrates capacitor currents in a conventional inverter, according to aspects of the present disclosure.

During the second experiment, the present circuit 100 was analyzed and compared with the conventional inverter. FIG. 5A illustrates capacitor currents ($IC_1$ and $IC_2$) in the conventional inverter. Signal 500 illustrates current ($IC_1$) in the first capacitor $C_1$ in the conventional inverter. Signal 510 illustrates current ($IC_2$) in the second capacitor $C_2$ in the conventional inverter.

Figure 5B:
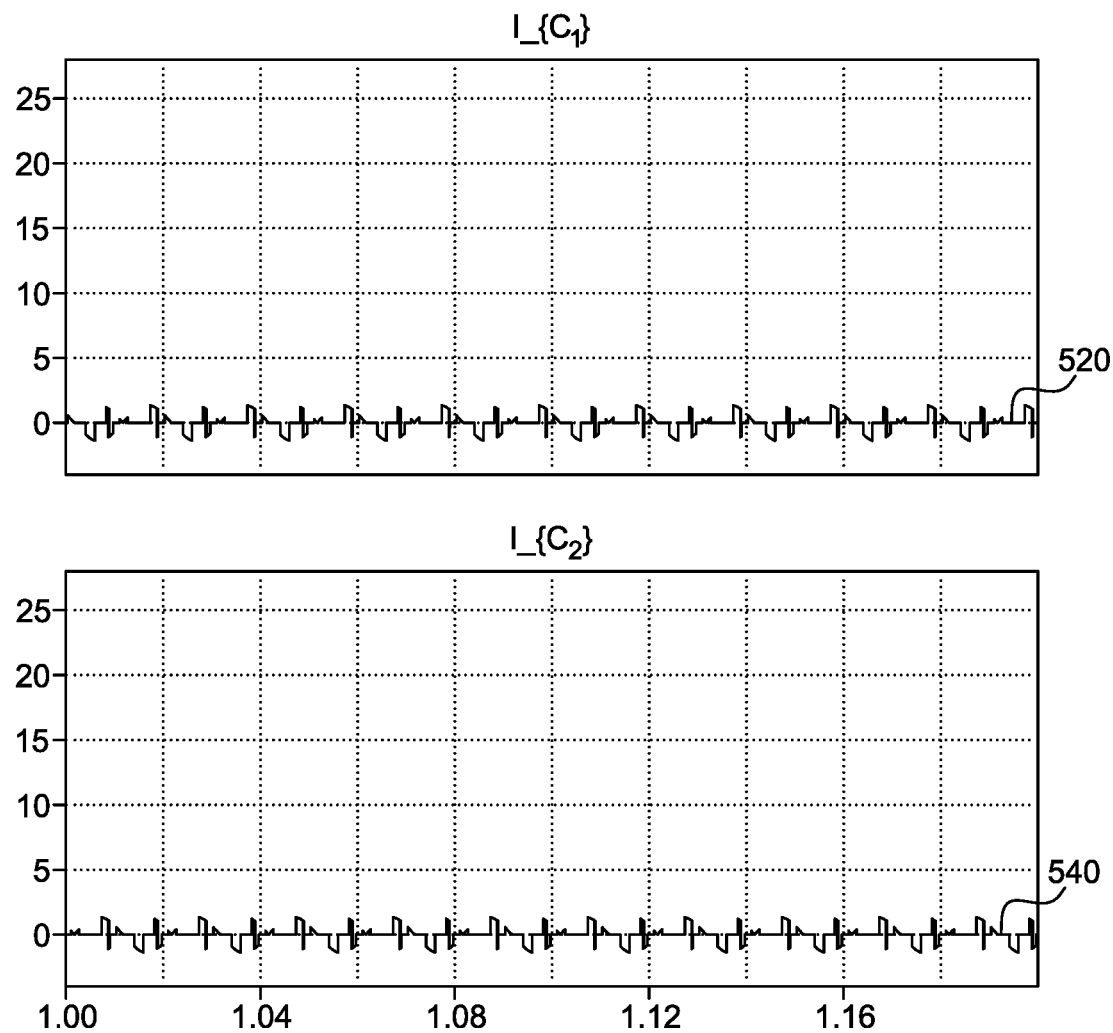
FIG. 5B illustrates capacitor currents in the inverter topology circuit, according to aspects of the present disclosure.

FIG. 5B illustrates capacitor currents ($IC_1$ and $IC_2$) in the circuit 100. Signal 520 illustrates current ($IC_1$) in the first capacitor $C_1$ in the circuit 100. Signal 540 illustrates current ($IC_2$) in the second capacitor $C_2$ in the circuit 100.

From experimentation, it was demonstrated that the circuit 100 exhibits 20 times decrease in the capacitor inrush currents. Inrush currents lead to heating of the capacitors through their equivalent series resistance (ESR), leading to early evaporation of the electrolyte and its early cessation. Thus, the circuit 100 provides a more reliable capacitor operation. The comparison of capacitor inrush currents of both capacitors is shown in FIG. 5A-FIG. 5B.

Figure 6A:
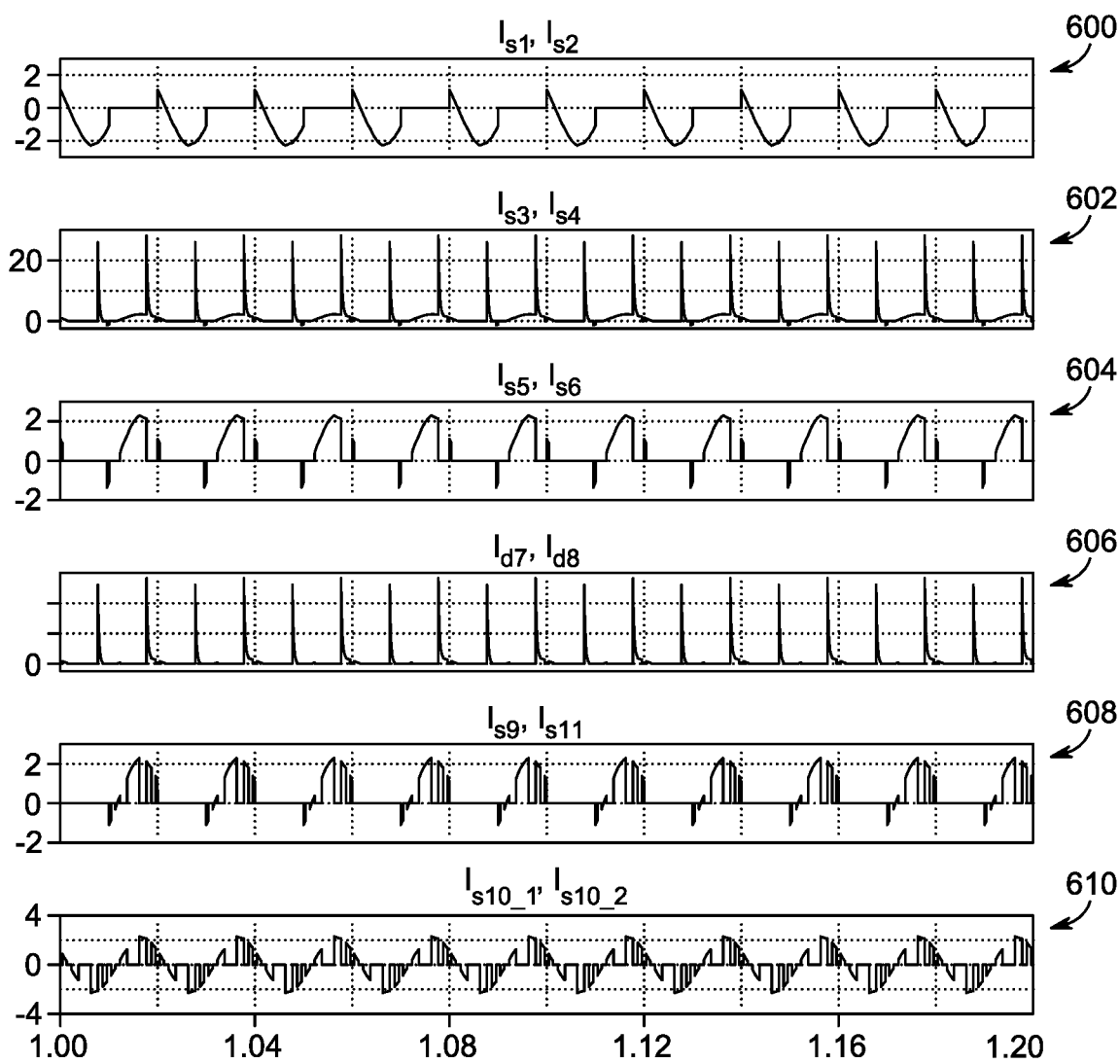
FIG. 6A illustrates current behavior through switches/diodes in the conventional inverter, according to aspects of the present disclosure.

FIG. 6A illustrates current behavior through the switches/diodes in the conventional inverter. Signal 600 illustrates the first switch current $I_{s1}$ and the second switch current $I_{s2}$ in the conventional inverter. Signal 602 illustrates the third switch current $I_{s3}$ and the fourth switch current $I_{s4}$ in the conventional inverter. Signal 604 illustrates the fifth switch current $I_{s5}$ and the sixth switch current $I_{s6}$ in the conventional inverter. Signal 606 illustrates the seventh diode current $I_{d7}$ and the eighth diode current $I_{d8}$ in the conventional inverter. Signal 608 illustrates the ninth switch current $I_{s9}$ and the eleventh switch current $I_{s11}$ in the conventional inverter. Signal 610 illustrates a first component of the tenth switch current $I_{s10\_1}$ and a second component of the tenth switch current $I_{s10\_2}$ in the conventional inverter.

Figure 6B:
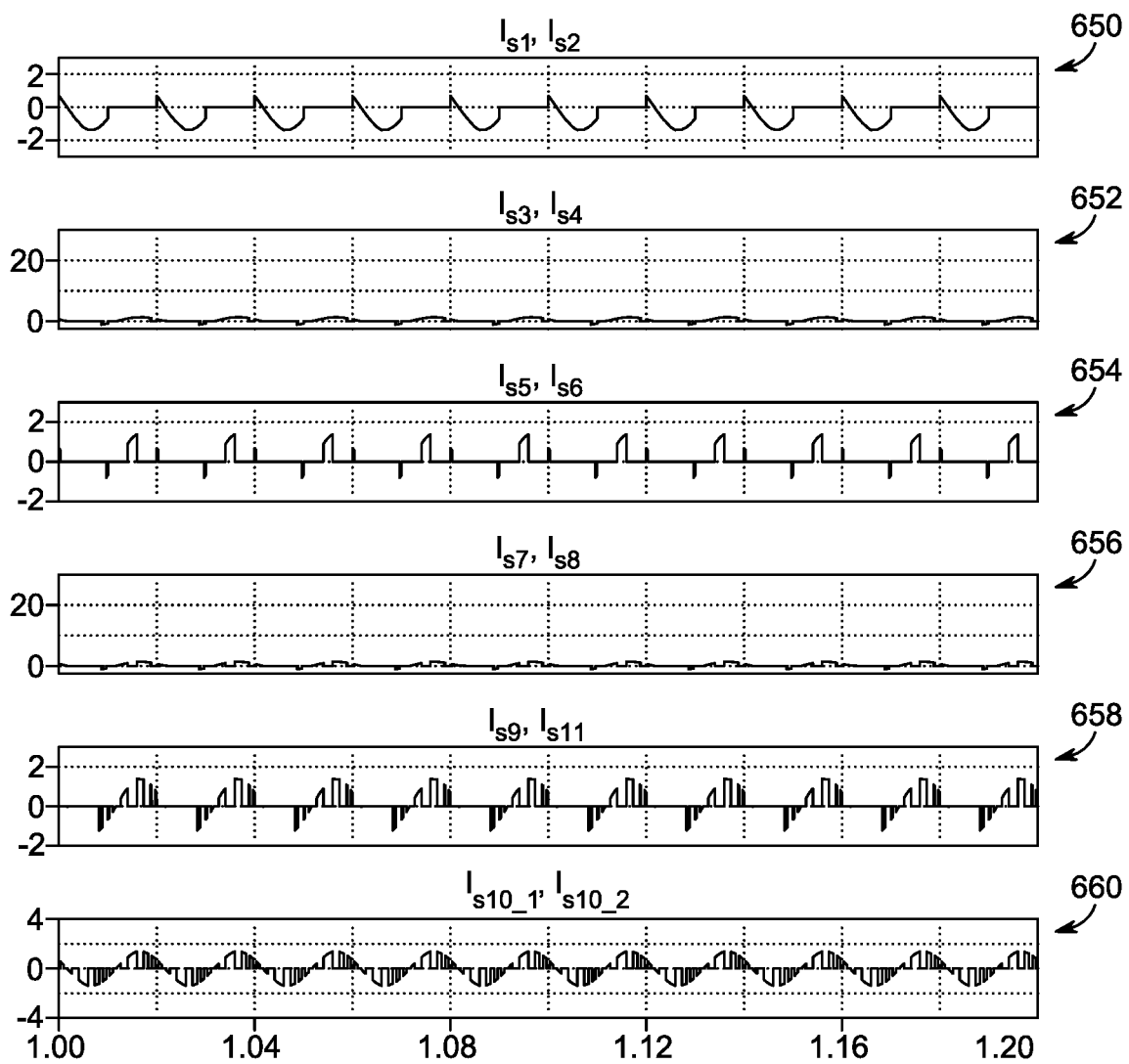
FIG. 6B illustrates current behavior through switches/diodes in the inverter topology circuit, according to aspects of the present disclosure.

FIG. 6B illustrates current behavior through the switches in the circuit 100. Signal 650 illustrates the first switch current $I_{s1}$ and the second switch current $I_{s2}$ in the circuit 100. Signal 652 illustrates the third switch current $I_{s3}$ and the fourth switch current $I_{s4}$ in the circuit 100. Signal 654 illustrates the fifth switch current $I_{s5}$ and the sixth switch current $I_{s6}$ in the circuit 100. Signal 656 illustrates the seventh switch current $I_{s7}$ and the eighth switch current $I_{s8}$ in the circuit 100. Signal 658 illustrates the ninth switch current $I_{s9}$ and the eleventh switch current $I_{s11}$ in the circuit 100. Signal 660 illustrates a first component of the tenth switch current $I_{s10\_1}$ and a second component of the tenth switch current $I_{s10\_2}$ in the circuit 100.

The inrush current due to capacitors affects the switches and the diodes of the inverter. In circuit 100, the current through the switches coming in series with the capacitor falls by 20 times as seen in FIG. 6A-FIG. 6B.

Figure 7A:
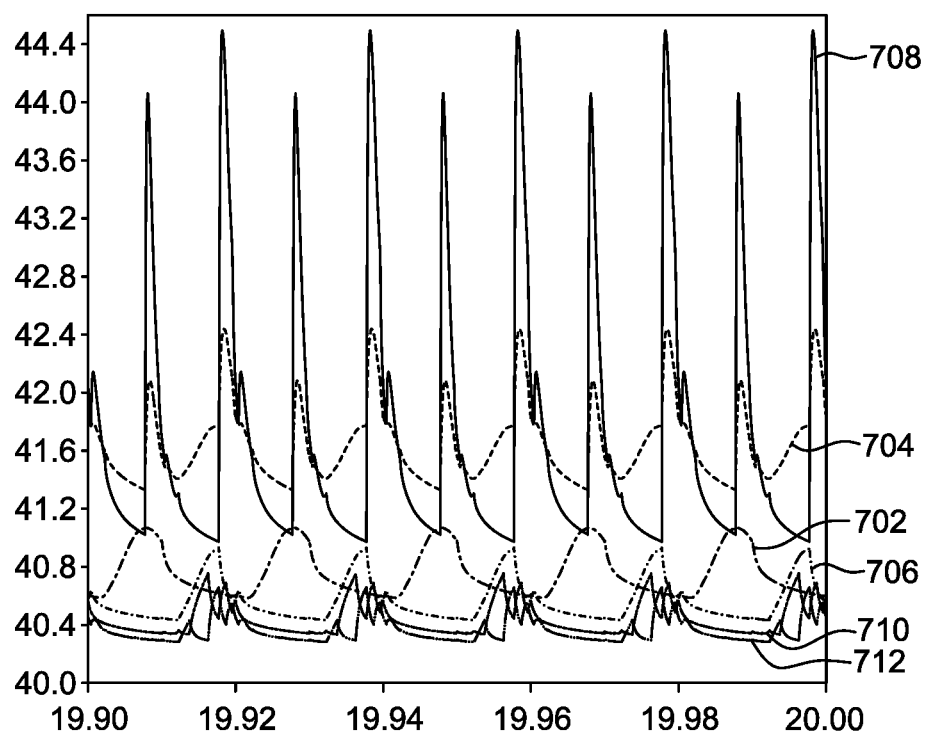
FIG. 7A illustrates a junction temperature of the switches/diodes in the conventional inverter, according to aspects of the present disclosure.

FIG. 7A illustrates the junction temperature of the switches/diodes in the conventional inverter. Signal 702 illustrates the junction temperature of the first switch $S_1$ in the conventional inverter. Signal 704 illustrates the junction temperature of the third switch $S_3$ in the conventional inverter. Signal 706 illustrates the junction temperature of the fifth switch $S_5$ in the conventional inverter. Signal 708 illustrates the junction temperature of the first diode $D_1$ in the conventional inverter. Signal 710 illustrates the junction temperature of the seventh switch $S_7$ in the conventional inverter. Signal 712 illustrates the junction temperature of a first component of the eighth switch $S_{8\_1}$ in the conventional inverter.

Figure 7B:
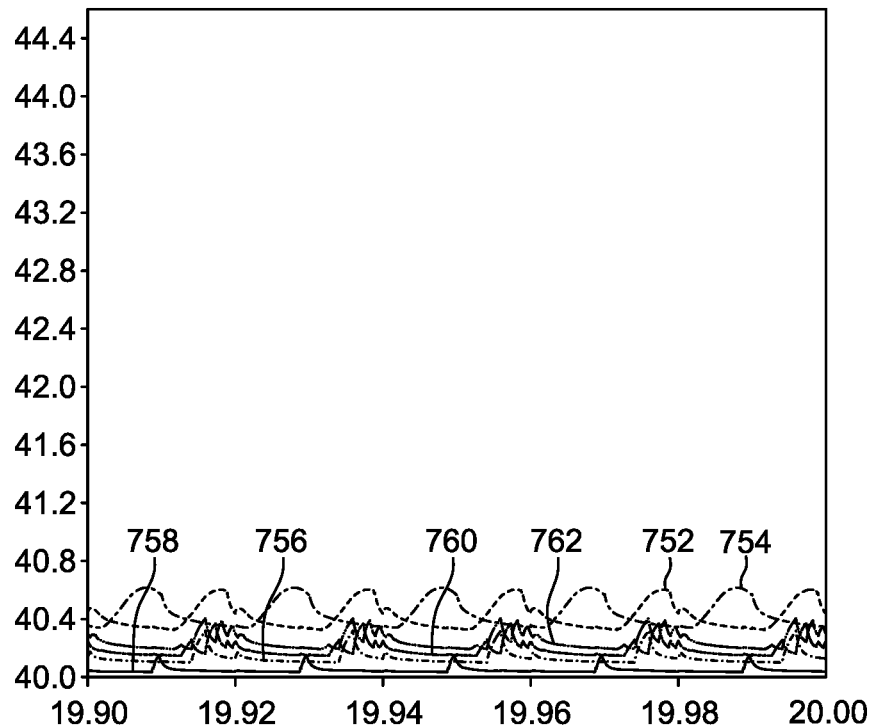
FIG. 7B illustrates a junction temperature of the switches/diodes in the inverter topology circuit, according to aspects of the present disclosure.

FIG. 7B illustrates the junction temperature of the switches/diodes in the circuit 100. Signal 752 illustrates the junction temperature of the first switch $S_1$ in the circuit 100. Signal 754 illustrates the junction temperature of the third switch $S_3$ in the circuit 100. Signal 756 illustrates the junction temperature of the fifth switch $S_5$ in the circuit 100. Signal 758 illustrates the junction temperature of the seventh switch $S_7$ in the circuit 100. Signal 760 illustrates the junction temperature of the ninth switch $S_9$ in the circuit 100. Signal 762 illustrates the junction temperature of the first component of the tenth switch $S_{10\_1}$ in the circuit 100.

In the present circuit 100, the switches have low junction temperatures such that the switches can be used for long-duration operation than the conventional inverter. It also ensures that the present circuit 100 performs better in high-temperature conditions than the conventional inverter. The results are shown in FIG. 7A-FIG. 7B.

Figure 8A:
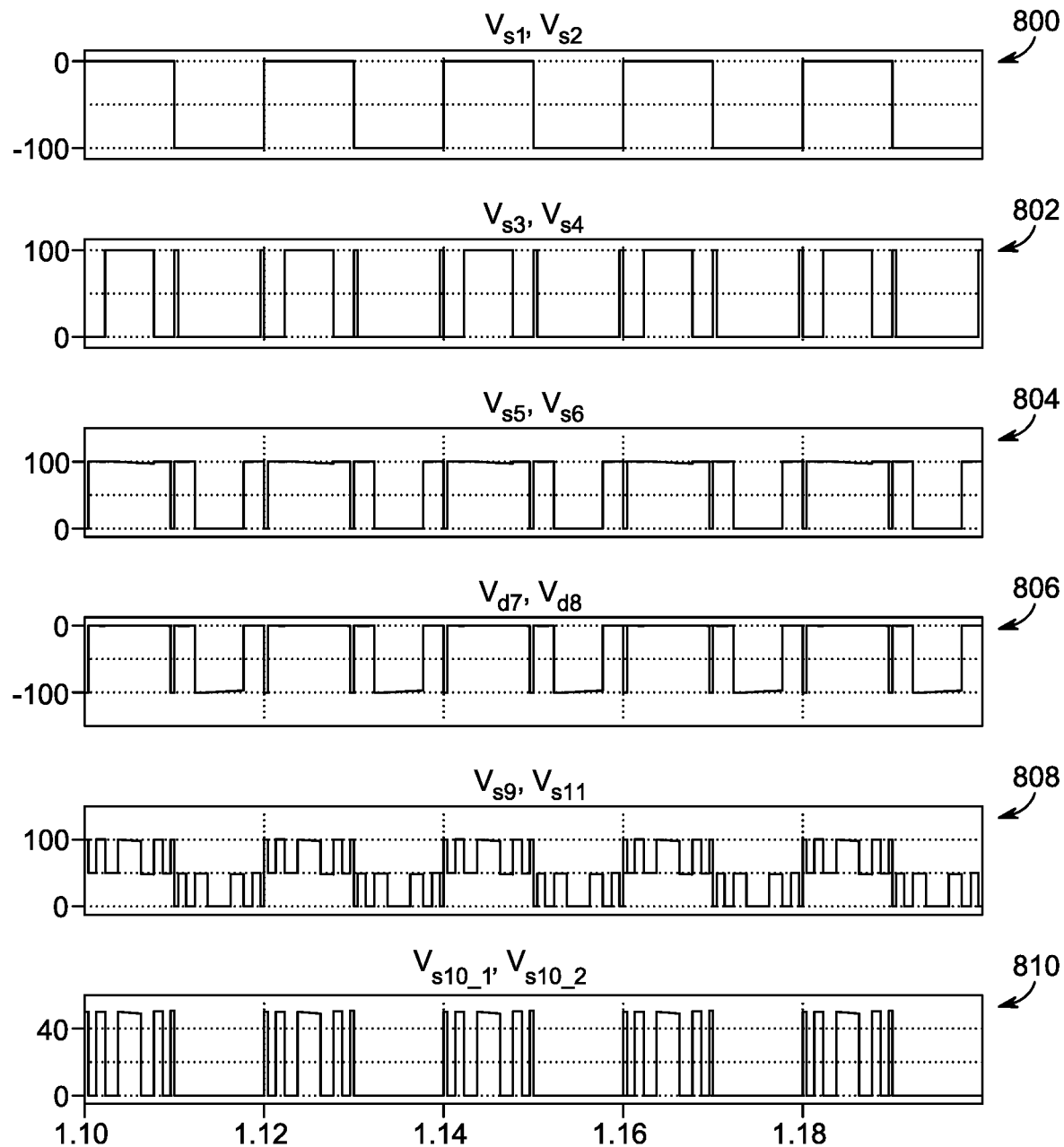
FIG. 8A illustrates a blocking voltage across the switches/diodes in the conventional inverter, according to aspects of the present disclosure.

FIG. 8A illustrates blocking voltage across the switches/diodes in the conventional inverter. Signal 800 illustrates the first switch voltage $V_{s1}$ and the second switch voltage $V_{s2}$ in the conventional inverter. Signal 802 illustrates the third switch voltage $V_{s3}$ and the fourth switch voltage $V_{s4}$ in the conventional inverter. Signal 804 illustrates the fifth switch voltage $V_{s5}$ and the sixth switch voltage $V_{s6}$ in the conventional inverter. Signal 806 illustrates the seventh diode voltage $V_{d7}$ and the eighth diode voltage $V_{d8}$ in the conventional inverter. Signal 808 illustrates the ninth switch voltage $V_{s9}$ and the eleventh switch voltage $V_{s11}$ in the conventional inverter. Signal 810 illustrates a first component of the tenth switch voltage $V_{s10\_1}$ and a second component of the tenth switch voltage $V_{s10\_2}$ in the conventional inverter.

Figure 8B:
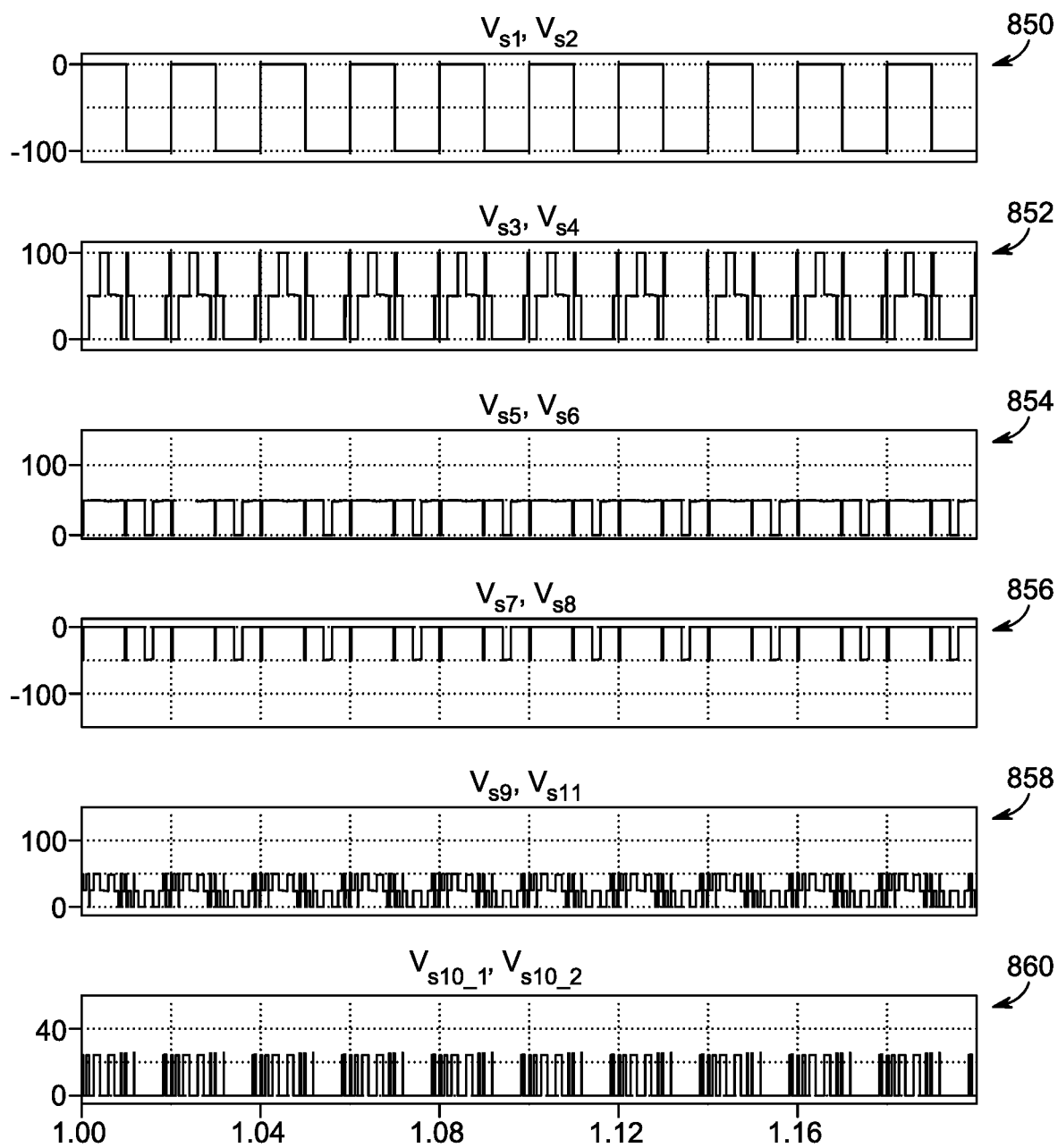
FIG. 8B illustrates a blocking voltage across the switches/diodes in the inverter topology circuit, according to aspects of the present disclosure.

FIG. 8B illustrates blocking voltage across the switches/diodes in the circuit 100. Signal 850 illustrates the first switch voltage $V_{s1}$ and the second switch voltage $V_{s2}$ in the circuit 100. Signal 852 illustrates the third switch voltage $V_{s3}$ and the fourth switch voltage $V_{s4}$ in the circuit 100. Signal 854 illustrates the fifth switch voltage $V_{s5}$ and the sixth switch voltage $V_{s6}$ in the circuit 100. Signal 856 illustrates the seventh switch voltage $V_{s7}$ and the eighth switch voltage $V_{s8}$ in the circuit 100. Signal 858 illustrates the ninth switch voltage $V_{s9}$ and the eleventh switch voltage $V_{s11}$ in the circuit 100. Signal 860 illustrates a first component of the tenth switch voltage $V_{s10\_1}$ and a second component of the tenth switch voltage $V_{s10\_2}$ in the circuit 100. In the present circuit 100, although the maximum voltage is blocked by the switch. In an aspect, the maximum voltage is equal to DC source voltage. In an example, some of the switches exhibit lower voltage as shown in FIG. 8A-FIG. 8B.

Figure 9A:
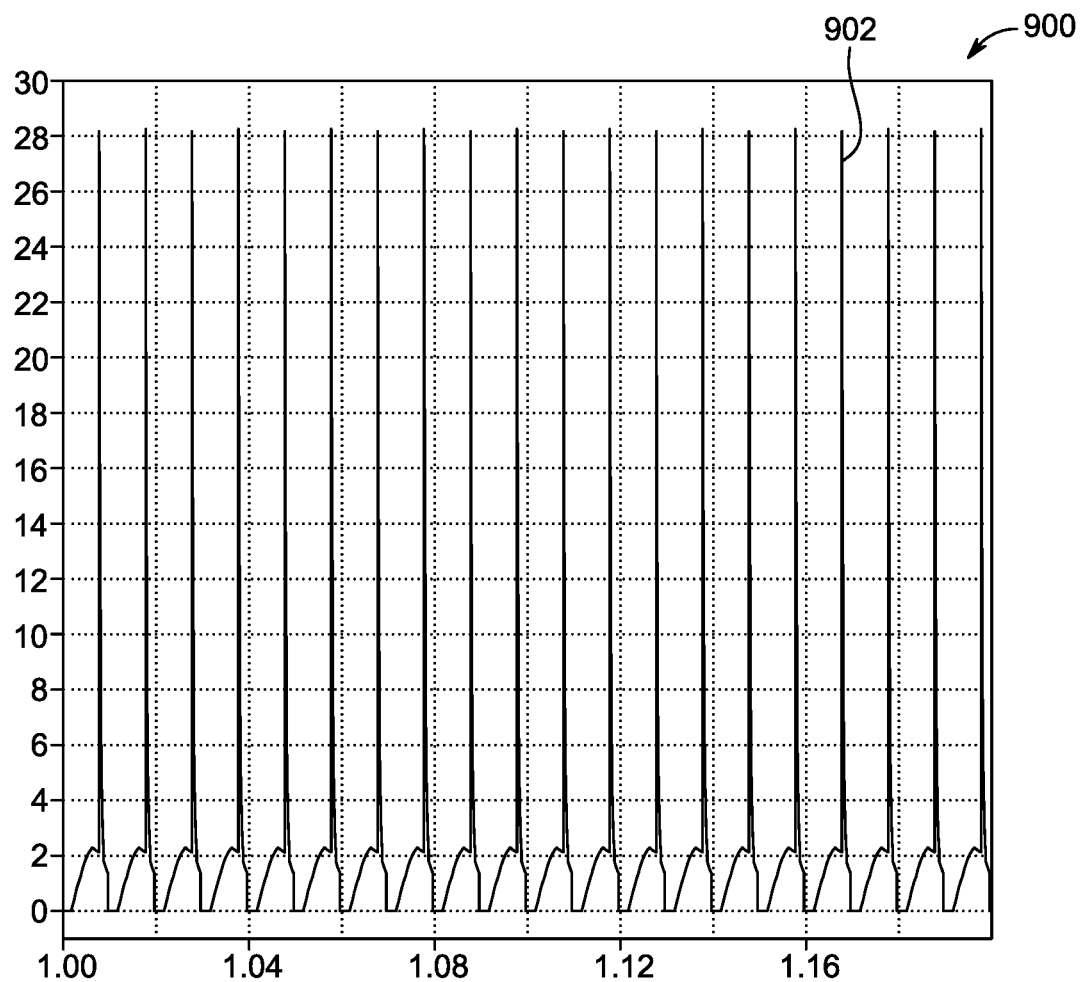
FIG. 9A illustrates a graph of source current behavior in the conventional inverter, according to aspects of the present disclosure.
Figure 9B:
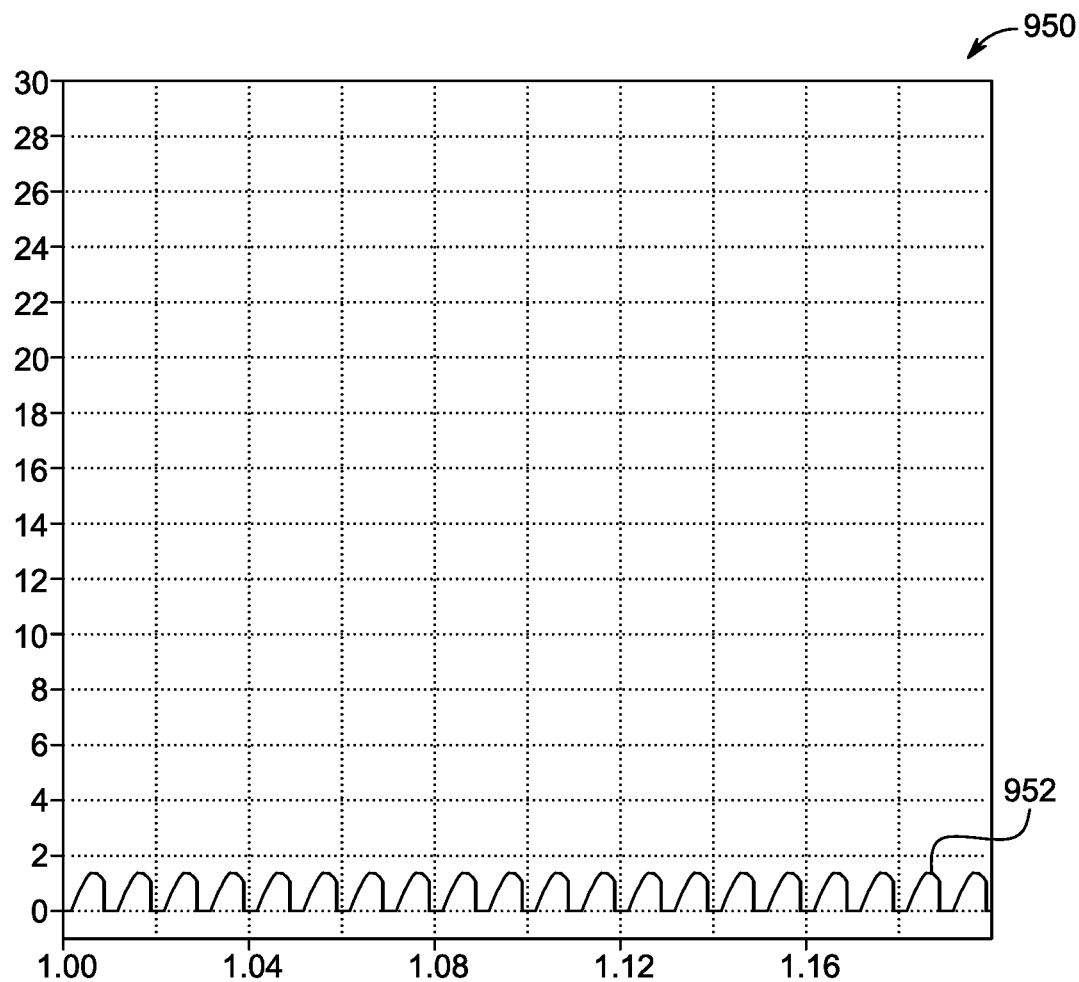
FIG. 9B illustrates a graph of source current behavior in the inverter topology circuit, according to aspects of the present disclosure.

FIG. 9A illustrates a graph 900 of source current in the conventional inverter. Signal 902 illustrates output current ($V_o$) in the conventional inverter. FIG. 9B illustrates a graph 950 of source current in the circuit 100. Signal 952 illustrates output current ($V_o$) in the circuit 100. The low capacitor inrush current leads to low current stress on the source compared to the conventional inverter, as shown in FIG. 9A-FIG. 9B.

In the present circuit 100, the circuit currents are stable and contribute to the reliable operation of the inverter (circuit 100) than the conventional inverter, especially in high-temperature conditions. Using fewer components to produce 11-levels and a reliable performance is a resilient solution for single-phase Solar PV applications to be implemented in high-temperature zones.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An inverter topology circuit, comprising:
    a direct current source; a first capacitor; a second capacitor;
    a first switch, a second switch, a third switch, and a fourth switch, wherein:
    a first side of the first switch and a first side of the third switch are connected to a first side of the direct current source, while a first side of the second switch and a first side of the fourth switch are connected to a second side of the direct current source;
    a fifth switch, a sixth switch, a seventh switch, and an eighth switch, wherein:
    a first side of the fifth switch and a first side of the seventh switch are connected to a second side of the third switch, while a first side of the sixth switch and a first side of the eighth switch are connected to a second side of the fourth switch;
    a ninth switch, wherein:
    a first side of the ninth switch, a second side of the sixth switch, and a second side of the seventh switch are connected to a first side of the first capacitor;
    a tenth switch, wherein:
    a first side of the tenth switch, a second side of the first capacitor are connected to a first side of the second capacitor;
    an eleventh switch, wherein:
    a first side of the eleventh switch, a second side of the fifth switch, and a second side of the eighth switch are connected to a second side of the second capacitor; and
    the first capacitor and the second capacitor are connected in series and are connected in parallel with the direct current source.

2. The circuit of claim 1, wherein the switches are insulated gate bipolar transistors (IGBTs).

3. The circuit of claim 2, wherein the tenth switch is formed with two IGBTs with the emitters connected in series.

4. The circuit of claim 1, wherein the first capacitor and the second capacitor have a capacitor inrush current of less than 5 amperes at a max capacitance of 1700 μF and an input voltage to the circuit of 100 V.

5. The circuit of claim 1, wherein the first side of the direct current source is the positive pole, and the second side of the direct current source is the negative pole.

6. The circuit of claim 1, wherein the first side of the first switch, the third switch, the fifth switch, the eighth switch, the ninth switch, and the second side of the second switch, the fourth switch, the sixth switch, the seventh switch, the eleventh switch are collectors of the switches.

7. The circuit of claim 1, wherein the second side of the first switch, the third switch, the fifth switch, the eighth switch, the ninth switch, and the first side of the second switch, the fourth switch, the sixth switch, the seventh switch, the eleventh switch are emitters of the switches.

8. The circuit of claim 1, wherein the first side of the first capacitor and the second capacitor are anodes of the capacitors.

9. The circuit of claim 1, wherein the second side of the first capacitor and the second capacitor are cathodes of the capacitors.

10. A method for controlling the charging and discharging of a first capacitor and a second capacitor in an inverter, comprising:
    determining a DC link voltage $V_{dc}$ of the inverter;
    determining a state of an inverter by a nearest-level control (NLC);
    determining a direction of current flow;
    determining a magnitude of an auxiliary DC link voltage;
    determining a threshold of the auxiliary DC link voltage;
    in response to the state level being $+V_{dc}/2$, the current flow being positive, and the magnitude of the auxiliary DC link voltage being higher than the threshold, charging the first capacitor and the second capacitor;
    in response to the state level being $+V_{dc}/2$, the current flow being positive, and the magnitude of the auxiliary DC link voltage being lower than the threshold, discharging the first capacitor and the second capacitor;
    in response to the state level being $+V_{dc}/2$, the current flow being negative, and the magnitude of the auxiliary DC link voltage being higher than the threshold, charging the first capacitor and the second capacitor;
    in response to the state level being $+V_{dc}/2$, the current flow being negative, and the magnitude of the auxiliary DC link voltage being lower than the threshold, discharging the first capacitor and the second capacitor;
    in response to the state level being $-V_{dc}/2$, the current flow being positive, and the magnitude of the auxiliary DC link voltage being higher than the threshold, charging the first capacitor and the second capacitor;
    in response to the state level being $-V_{dc}/2$, the current flow being positive, and the magnitude of the auxiliary DC link voltage being lower than the threshold, discharging the first capacitor and the second capacitor;
    in response to the state level being $-V_{dc}/2$, the current flow being negative, and the magnitude of the auxiliary DC link voltage being higher than the threshold, charging the first capacitor and the second capacitor; and
    in response to the state level being $-V_{dc}/2$, the current flow being negative, and the magnitude of the auxiliary DC link voltage being lower than the threshold, discharging the first capacitor and the second capacitor,
    wherein the inverter further includes:
    a direct current source;
    a first switch, a second switch, a third switch, and a fourth switch, wherein:
    a first side of the first switch and a first side of the third switch are connected to a first side of the direct current source, while a first side of the second switch and a first side of the fourth switch are connected to a second side of the direct current source;
    a fifth switch, a sixth switch, a seventh switch and an eight switch, wherein:
    a first side of the fifth switch and a first side of the seventh switch are connected to a second side of the third switch, while a first side of the sixth switch and a first side of the eighth switch are connected to a second side of the fourth switch;

a ninth switch, wherein:

a first side of the ninth switch, a second side of the sixth switch, and a second side of the seventh switch are connected to a first side of the first capacitor;

a tenth switch, wherein:

a first side of the tenth switch, a second side of the first capacitor are connected to a first side of the second capacitor;

an eleventh switch, wherein:

a first side of the eleventh switch, a second side of the fifth switch, and a second side of the eighth switch are connected to a second side of the second capacitor; and the first capacitor and the second capacitor are connected in series and are connected in parallel with the direct current source.

11. The method of claim 10, wherein the threshold of the auxiliary DC link voltage is 50V.

12. The method of claim 10, wherein the switches are insulated gate bipolar transistors (IGBTs).

13. The method of claim 12, wherein the tenth switch includes two IGBTs with the emitters connected in series.

14. The method of claim 10, wherein the first capacitor and the second capacitor have a capacitor inrush current of less than 5 amperes at a max capacitance of 1700 μF and an input voltage to the circuit of 100 V.

15. The method of claim 10, wherein the first side of the direct current source is the positive pole, and the second side of the direct current source is the negative pole.

16. The method of claim 10, wherein the first side of the first switch, the third switch, the fifth switch, the eighth switch, the ninth switch, and the second side of the second switch, the fourth switch, the sixth switch, the seventh switch, the eleventh switch are collectors of the switches.

17. The method of claim 10, wherein the second side of the first switch, the third switch, the fifth switch, the eighth switch, the ninth switch, and the first side of the second switch, the fourth switch, the sixth switch, the seventh switch, the eleventh switch are emitters of the switches.

18. The method of claim 10, wherein the first side of the first capacitor and the second capacitor are anodes of the capacitors.

19. The method of claim 10, wherein the second side of the first capacitor and the second capacitor are cathodes of the capacitors.

* * * * *